United States Patent
Seidel et al.

(10) Patent No.: US 12,143,932 B2
(45) Date of Patent: Nov. 12, 2024

(54) APPARATUS AND METHOD FOR A DISTRIBUTED UNIT OF A COMMUNICATION SYSTEM

(71) Applicant: NOKIA SOLUTIONS AND NETWORKS OY, Espoo (FI)

(72) Inventors: Eiko Seidel, Sauerlach (DE); Gábor Hannák, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/535,253

(22) Filed: Dec. 11, 2023

(65) Prior Publication Data

US 2024/0236847 A1 Jul. 11, 2024

(30) Foreign Application Priority Data

Jan. 9, 2023 (FI) ..................................... 20235026

(51) Int. Cl.
*H04W 52/02* (2009.01)
(52) U.S. Cl.
CPC .............................. *H04W 52/0206* (2013.01)
(58) Field of Classification Search
CPC ................................................ H04W 52/0206
USPC ........................................................ 370/311
See application file for complete search history.

(56) References Cited

U.S. PATENT DOCUMENTS

| | | | |
|---|---|---|---|
| 2017/0019858 A1* | 1/2017 | Zhao | H04W 52/0216 |
| 2021/0368438 A1* | 11/2021 | Li | H04W 52/028 |
| 2023/0188233 A1* | 6/2023 | Gupta Hyde | H04B 17/3913 |
| | | | 370/329 |
| 2023/0209390 A1 | 6/2023 | Zeng et al. | |

FOREIGN PATENT DOCUMENTS

| | | |
|---|---|---|
| CN | 114466433 A | 5/2022 |
| WO | 2017/095279 A1 | 6/2017 |
| WO | 2022/042528 A1 | 3/2022 |
| WO | 2022/084469 A | 4/2022 |
| WO | 2023/273669 A1 | 1/2023 |

OTHER PUBLICATIONS

Office Action—First Opinion on Patentability dated Jun. 1, 2023 corresponding to Finnish Patent Application No. 20235026.
Finnish Search Report dated Jun. 1, 2023 corresponding to Finnish Patent Application No. 20235026.
Office Action—Communication of Acceptance dated Oct. 6, 2023 corresponding to Finnish Patent Application No. 20235026.

(Continued)

*Primary Examiner* — Gbemileke J Onamuti
(74) *Attorney, Agent, or Firm* — SQUIRE PATTON BOGGS (US) LLP

(57) ABSTRACT

An apparatus for a distributed unit of a communication system, the apparatus comprising at least one processor, and at least one memory storing instructions, the at least one memory and the instructions configured to, with the at least one processor, cause the distributed unit to receive from at least one radio unit first information characterizing a capability of the at least one radio unit associated with at least one energy saving function.

18 Claims, 13 Drawing Sheets

(56) References Cited

OTHER PUBLICATIONS

Figure 1A:
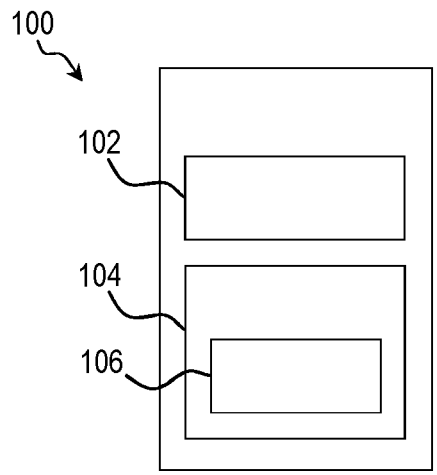

3GPP TS 28.552 V18.0.0 (Sep. 2022), Technical Specification, 3rd Generation Partnership Project; Technical Specification Group Services and System Aspects; Management and orchestration; 5G performance measurements (Release 18), Sep. 2022.
3GPP TS 28.554 V17.8.0 (Sep. 2022), Technical Specification, 3rd Generation Partnership Project; Technical Specification Group Services and System Aspects; Management and orchestration; 5G end to end Key Performance Indicators (KPI) (Release 17), Sep. 2022.
Extended European Search Report corresponding to EP Application No. 23214182.0, dated May 16, 2024.

\* cited by examiner

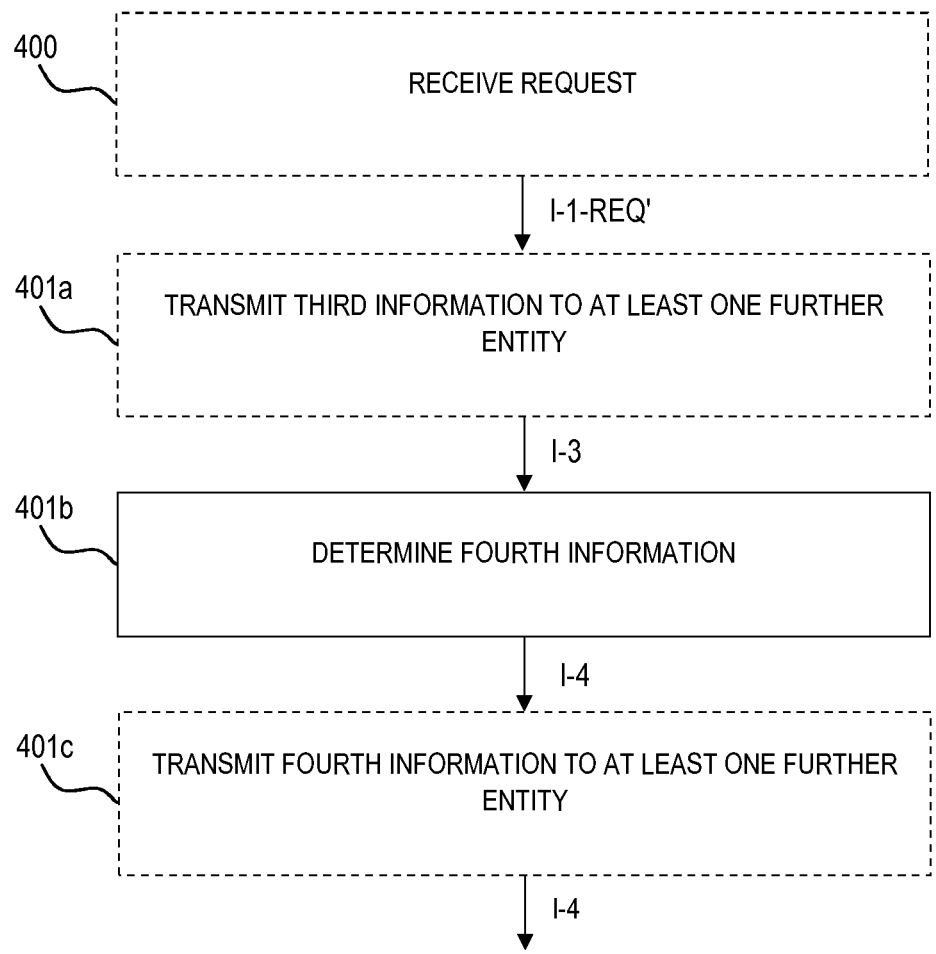

APPARATUS AND METHOD FOR A DISTRIBUTED UNIT OF A COMMUNICATION SYSTEM

CROSS REFERENCE TO RELATED APPLICATION

This application claims the benefit of Finnish Patent Application No. 20235026, filed Jan. 9, 2023. The entire content of the above-referenced application is hereby incorporated by reference.

FIELD OF THE DISCLOSURE

Various example embodiments relate to an apparatus for a distributed unit of a communication system.

Further example embodiments relate to an apparatus for a radio unit of a communication system.

Further example embodiments relate to an apparatus for a communication system.

Further example embodiments relate to a distributed unit of a communication system.

Further example embodiments relate to a radio unit of a communication system.

Further example embodiments relate to a radio access network controller.

Further example embodiments relate to a communication system.

BACKGROUND

Communication systems may comprise one or more radio access networks, RAN, and the RAN may inter alia comprise one or more distributed units and/or radio units, e.g. forming part of one or more base stations.

As in at least some conventional communication systems, electric energy consumption is responsible for a substantial part of operational expenditure e.g. of a mobile network operator, in some approaches, it may be desirable to reduce a consumption of electric energy of at least some components of a communication system.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some exemplary embodiments relate to an apparatus for a distributed unit of a communication system, the apparatus comprising at least one processor, and at least one memory storing instructions, the at least one memory and the instructions configured to, with the at least one processor, cause the distributed unit to receive from at least one radio unit first information characterizing a capability of the at least one radio unit associated with at least one energy saving function. In some exemplary embodiments, this enables to collect information on the capabilities of the at least one radio unit regarding the at least one energy saving function. In some exemplary embodiments, on this basis, aspects of an operation of the at least one radio unit (and/or of the distributed unit associated with the at least one radio unit) may be, at least temporarily, controlled.

In some exemplary embodiments, the instructions, when executed by the at least one processor, cause the distributed unit to transmit the first information to at least one further entity.

In some exemplary embodiments, the distributed unit may e.g. form part of a network device, e.g. base station, e.g. gNB, e.g. according to and/or based on some accepted standard and/or architecture such as e.g. 3G, 4G, 5G, 6G, O-RAN (Open Radio Access Network). As an example, in some exemplary embodiments, the distributed unit may e.g. be associated with, e.g. implement at least some functions of, an O-RAN Distributed Unit, O-DU, e.g. characterizing a, for example logical, node or device hosting RLC (radio link control)/MAC (medium access control)/High-PHY (physical) layers, e.g. based on a lower layer functional split.

In some exemplary embodiments, the radio unit may e.g. form part of a network device, e.g. base station, e.g. gNB, e.g. according to and/or based on some accepted standard and/or architecture such as e.g. 3G, 4G, 5G, 6G, O-RAN (Open Radio Access Network). As an example, in some exemplary embodiments, the radio unit may e.g. be associated with, e.g. implement at least some functions of, an O-RAN Radio Unit, O-RU, e.g. characterizing a, for example logical, node or device hosting a Low-PHY layer and radio frequency, RF, signal processing, e.g. based on a lower layer functional split.

In some exemplary embodiments, the at least one further entity may e.g. be or comprise a RAN Intelligent Controller, RIC, e.g. a near-RT (real-time) RIC or a non-RT RIC.

In some exemplary embodiments, the instructions, when executed by the at least one processor, cause the distributed unit to perform at least one of: a) receiving a request, e.g. from the at least one further entity, to request the first information from the at least one radio unit, b) requesting the first information from the at least one radio unit.

In some exemplary embodiments, the first information comprises at least one of: a) information characterizing at least one energy saving mode, for example sleep mode, supported by the at least one radio unit, b) information characterizing at least one energy saving feature supported by the at least one radio unit.

In some exemplary embodiments, the instructions, when executed by the at least one processor, cause the distributed unit to perform at least one of: a) negotiating a configuration (e.g., with the at least one radio unit and/or with the at least one further entity) which energy saving modes (e.g., at least one energy saving mode of e.g. a plurality of available energy saving modes) to utilize, b) negotiating a configuration (e.g., with the at least one radio unit and/or with the at least one further entity) which energy saving mode not to utilize, c) assigning an identifier to at least one energy saving mode, d) storing second information characterizing at least one energy saving mode to be utilized, e.g. selected from during an operation (e.g., by at least one of the distributed unit and the radio unit), e) transmitting third information characterizing a capability of the distributed unit associated with at least one energy saving function to at least one further entity, storing at least one of the first information or the third information or fourth information (see, for example, next paragraph). In some exemplary embodiments, the third information may e.g. be transmitted together with the first information to the at least one further entity.

In some exemplary embodiments, the distributed unit is configured to determine fourth information, e.g. based on at least one of the first information and the third information. In some exemplary embodiments, the fourth information may e.g. represent a subset, e.g. a common denominator, e.g.

common capabilities of the distributed unit and of the at least one radio unit associated with at least one energy saving function. In some exemplary embodiments, the distributed unit is configured to transmit the fourth information, e.g. to the at least one further entity, e.g. a RIC.

In some exemplary embodiments, at least some aspects of a or the RIC may e.g. be implemented within the distributed unit and/or within the apparatus for the distributed unit according to some embodiments. Thus, in some exemplary embodiments, the distributed unit may e.g. at least temporarily store at least one of the first information or the third information or the fourth information, e.g. for use by the RIC functionality.

In some exemplary embodiments, the instructions, when executed by the at least one processor, cause the distributed unit to perform at least one of: a) receiving control information, e.g. from the at least one further entity, characterizing at least one of a1) one or more energy saving functions or a2) one or more energy saving modes to be utilized, e.g. applied or selected, by at least one of A) the at least one distributed unit or B) at least one radio unit associated with the at least one distributed unit, b) utilizing, e.g. applying or selecting, at least one of b1) the one or more energy saving functions or b2) the one or more energy saving modes, c) configuring at least one radio unit associated with the distributed unit to utilize at least one of c1) the one or more energy saving functions or c2) the one or more energy saving modes based on the control information.

In some exemplary embodiments, at least one of the first information and the third information comprises at least one of: a) an identifier associated with at least one energy saving mode, b) a minimum activity time associated with the at least one energy saving mode, c) an indicator indicating whether the at least one energy saving mode can be used for at least one of c1) a downlink operation or c2) an uplink operation, d) at least one transition time characterizing at least one state transition or mode transition associated with the at least one energy saving mode, e.g. a state transition between two energy saving modes, e) at least one transition energy characterizing an energy associated with at least one state transition or mode transition associated with the at least one energy saving mode, e.g. a state transition between two energy saving modes, f) a power consumption associated with the at least one energy saving mode, g) aspects of a radio access network configuration.

Further exemplary embodiments relate to an apparatus for a distributed unit of a communication system, the apparatus comprising means for receiving from at least one radio unit first information characterizing a capability of the at least one radio unit associated with at least one energy saving function, and for transmitting the first information to at least one further entity. In some exemplary embodiments, the means for receiving the first information from the at least one radio unit comprise at least one processor, and at least one memory storing instructions, the at least one memory and the instructions configured to, with the at least one processor, cause the apparatus to perform the receiving of the first information.

Further exemplary embodiments relate to a method, comprising: receiving, by a distributed unit of a communication system, from at least one radio unit first information characterizing a capability of the at least one radio unit associated with at least one energy saving function, and transmitting, by the distributed unit, the first information to at least one further entity.

Further exemplary embodiments relate to an apparatus for a radio unit of a communication system, the apparatus comprising at least one processor, and at least one memory storing instructions, the at least one memory and the instructions configured to, with the at least one processor, cause the radio unit to transmit first information characterizing a capability of the radio unit associated with at least one energy saving function to a distributed unit of the communication system.

In some exemplary embodiments, the instructions, when executed by the at least one processor, cause the radio unit to receive a request, e.g. from the distributed unit, to provide the first information.

In some exemplary embodiments, the instructions, when executed by the at least one processor, cause the radio unit to receive control information instructing the radio unit to utilize at least one of a) one or more energy saving functions or b) one or more energy saving modes, and to utilize at least one of c) the one or more energy saving functions or d) the one or more energy saving modes based on the control information.

Further exemplary embodiments relate to an apparatus for a radio unit of a communication system, the apparatus comprising means for transmitting first information characterizing a capability of the radio unit associated with at least one energy saving function to at least one distributed unit of the communication system. In some exemplary embodiments, the means for transmitting the first information comprise at least one processor, and at least one memory storing instructions, the at least one memory and the instructions configured to, with the at least one processor, cause the apparatus to perform the transmitting of the first information.

Further exemplary embodiments relate to a method, comprising: transmitting, by a radio unit of a communication system, first information characterizing a capability of the radio unit associated with at least one energy saving function to at least one distributed unit of the communication system.

Further exemplary embodiments relate to an apparatus for a communication system, e.g. for at least one further entity, the apparatus comprising at least one processor, and at least one memory storing instructions, the at least one memory and the instructions configured to, with the at least one processor, cause the apparatus to receive from at least one distributed unit first information characterizing a capability associated with at least one energy saving function of at least one radio unit associated with the at least one distributed unit. In some exemplary embodiments, the apparatus is configured to receive at least one of the first information and/or the third information and/or the fourth information as exemplarily disclosed above. In some exemplary embodiments, the fourth information characterize e.g. a combined capability of the DU and of the at least one RU associated with at least one energy saving function.

In some exemplary embodiments, the instructions, when executed by the at least one processor, cause the apparatus to transmit a request to the at least one distributed unit to request the first information from the at least one radio unit associated with the at least one distributed unit.

In some exemplary embodiments, the instructions, when executed by the at least one processor, cause the apparatus to transmit to the at least one distributed unit control information characterizing at least one of a) one or more energy saving functions or b) one or more energy saving modes to be utilized by at least one of A) the at least one distributed unit or B) the at least one radio unit associated with the at least one distributed unit.

In some exemplary embodiments, the instructions, when executed by the at least one processor, cause the apparatus to provide a machine learning model that is at least one of a) trainable or b) configured, e.g. trained, to predict at least one of A) at least one preferred energy saving mode or B) at least one preferred energy saving feature based on conditions associated with the communication system.

In some exemplary embodiments, the at least one preferred energy saving mode and/or the at least one preferred energy saving feature may e.g. be preferred according to at least one, e.g. predetermined, criterion, such as e.g. an overall power consumption. In other words, in some exemplary embodiments, a preferred energy saving mode may be an energy saving mode which results in a best, e.g. lowest, overall power consumption.

In some exemplary embodiments, the machine learning model comprises at least one of: a) a neural network, b) a deep neural network, c) a classifier, d) a clustering method, e) a pattern detection technique, f) a data mining method, g) an estimation and detection method.

In some exemplary embodiments, the conditions associated with the communication system comprise at least one of: a) network configuration related data associated with the communication system, b) network performance related data associated with the communication system, e.g. at least one of b1) load, b2) energy consumption, b3) energy efficiency, b4) performance management data, b5) prediction data.

In some exemplary embodiments, the prediction data may e.g. include at least one of: a) load prediction, b) mobility prediction associated with terminal devices, e.g. user equipment, UE, c) QoS (quality of service) prediction, d) energy consumption prediction data.

In some exemplary embodiments, the instructions, when executed by the at least one processor, cause the apparatus to train the machine learning model based on the conditions associated with the communication system.

In some exemplary embodiments, the instructions, when executed by the at least one processor, cause the apparatus to use the machine learning model based on the conditions associated with the communication system.

Further exemplary embodiments relate to an apparatus for a communication system, the apparatus comprising means for receiving from at least one distributed unit at least first information characterizing a capability associated with at least one energy saving function of at least one radio unit associated with the at least one distributed unit. In some exemplary embodiments, the means for receiving comprise at least one processor, and at least one memory storing instructions, the at least one memory and the instructions configured to, with the at least one processor, cause the apparatus to perform the receiving of the first information.

In some exemplary embodiments, the apparatus is configured to receive at least one of the first information and/or the third information and/or the fourth information as exemplarily disclosed above. In some exemplary embodiments, the fourth information characterize e.g. a combined capability of the DU and of the at least one RU associated with at least one energy saving function.

Further exemplary embodiments relate to a method, comprising: receiving from at least one distributed unit at least first information characterizing a capability associated with at least one energy saving function of at least one radio unit associated with the at least one distributed unit. In some exemplary embodiments, the method comprises receiving at least one of the first information and/or the third information and/or the fourth information. Further exemplary embodiments relate to a distributed unit for a communication system, comprising at least one apparatus according to the embodiments.

Further exemplary embodiments relate to a radio unit for a communication system, comprising at least one apparatus according to the embodiments.

Further exemplary embodiments relate to a radio access network, RAN, controller, for example a radio access network intelligent controller, RIC, comprising at least one apparatus according to the embodiments.

Further exemplary embodiments relate to a communication system, e.g. communication network, comprising at least one of the following elements: a) an apparatus according to the embodiments, b) a distributed unit according to the embodiments, c) a radio unit according to the embodiments, d) a radio access network controller according to the embodiments.

Further exemplary embodiments relate to a computer program product comprising instructions which, when the program is executed by a computer, cause the computer to carry out the method according to the embodiments.

Further exemplary embodiments relate to a data carrier signal carrying and/or characterizing the computer program (product) according to the embodiments.

Further exemplary embodiments relate to a use of at least one of a) the apparatus according to the embodiments, b) the method according to the embodiments, c) the distributed unit according to the embodiments, d) the radio unit according to the embodiments, e) the RAN controller, for example RIC, according to the embodiments, f) the communication system, e.g. communication network, according to the embodiments, g) the computer program product according to the embodiments, h) the data carrier signal according to the embodiments, for at least one of the following elements: A) enabling a common control of energy saving modes of several components of a communication system, B) providing an efficient guidance or configuration of energy saving modes of several components of a communication system, C) reducing an overall electrical energy consumption of a communication system, D) unifying a control associated with energy saving modes of different components of a communication system, E) enabling a capability exchange of supported energy saving modes and/or sleep modes and/or energy saving functions of different components of a communication system, F) allocating identifiers for energy saving modes, e.g. sleep modes, G) dynamically, e.g. during an operation, optimizing an overall energy consumption of a communication network.

BRIEF DESCRIPTION OF SOME EXEMPLARY FIGURES

Figure 1B:
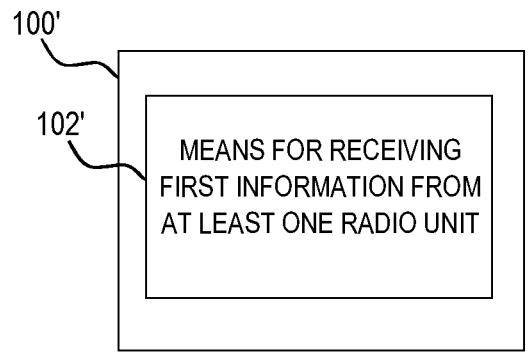
Figure 2:
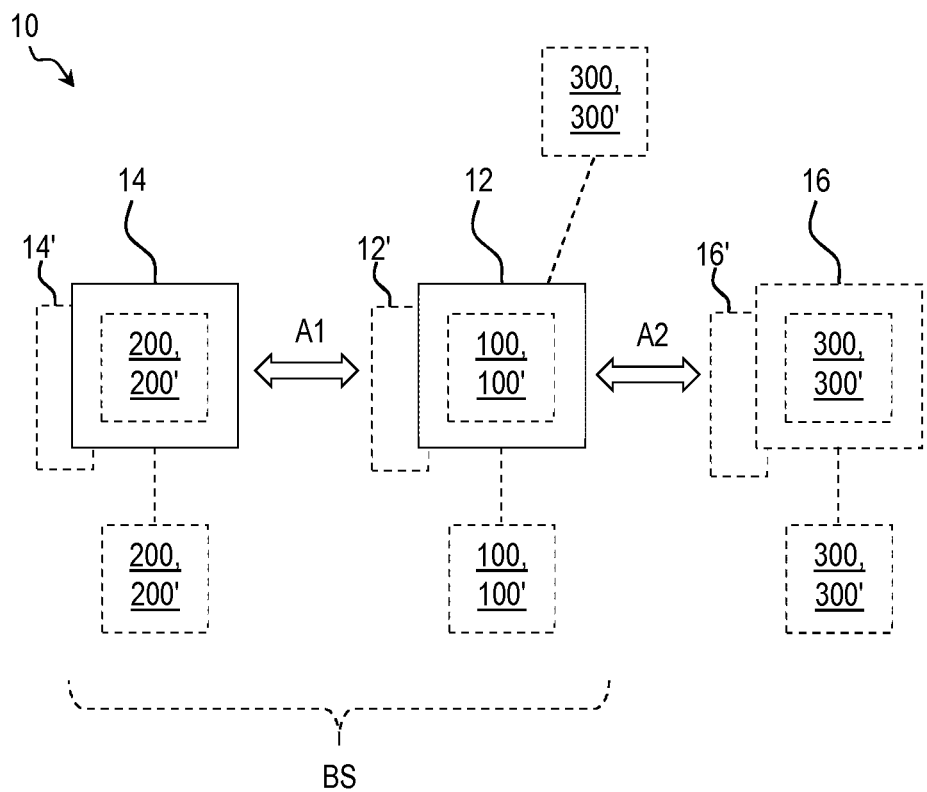
Figure 3A:
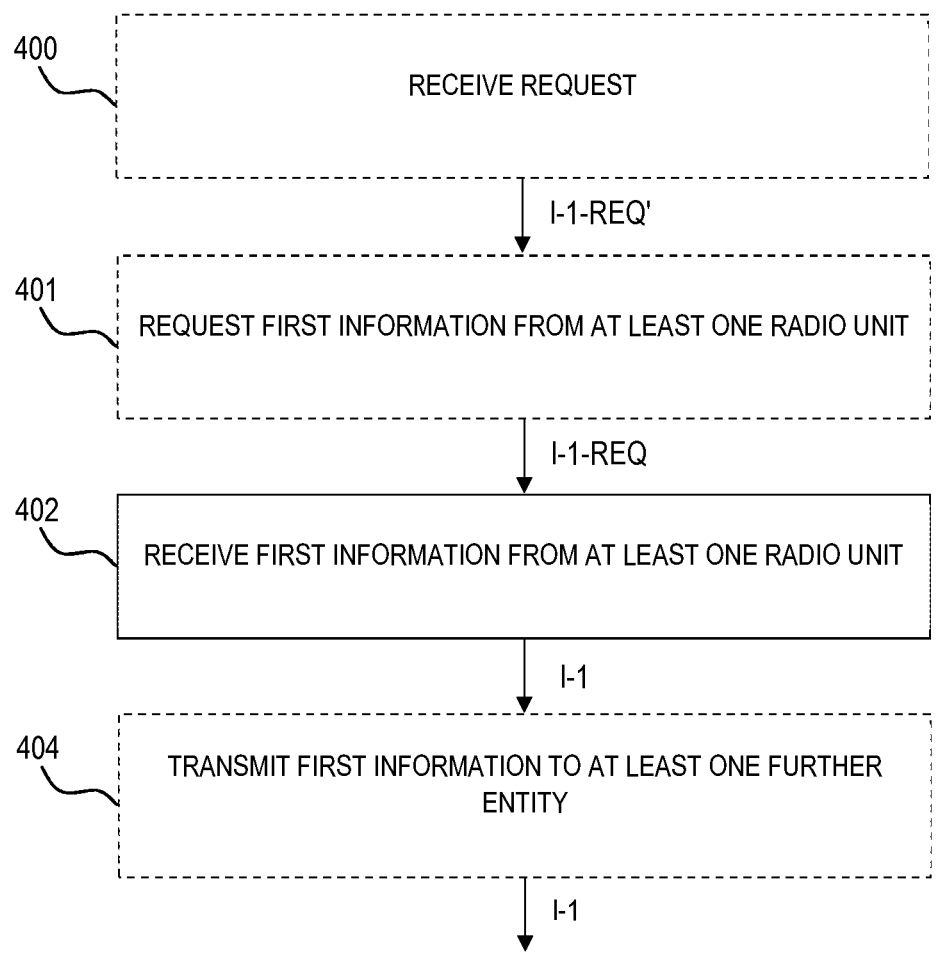
Figure 5:
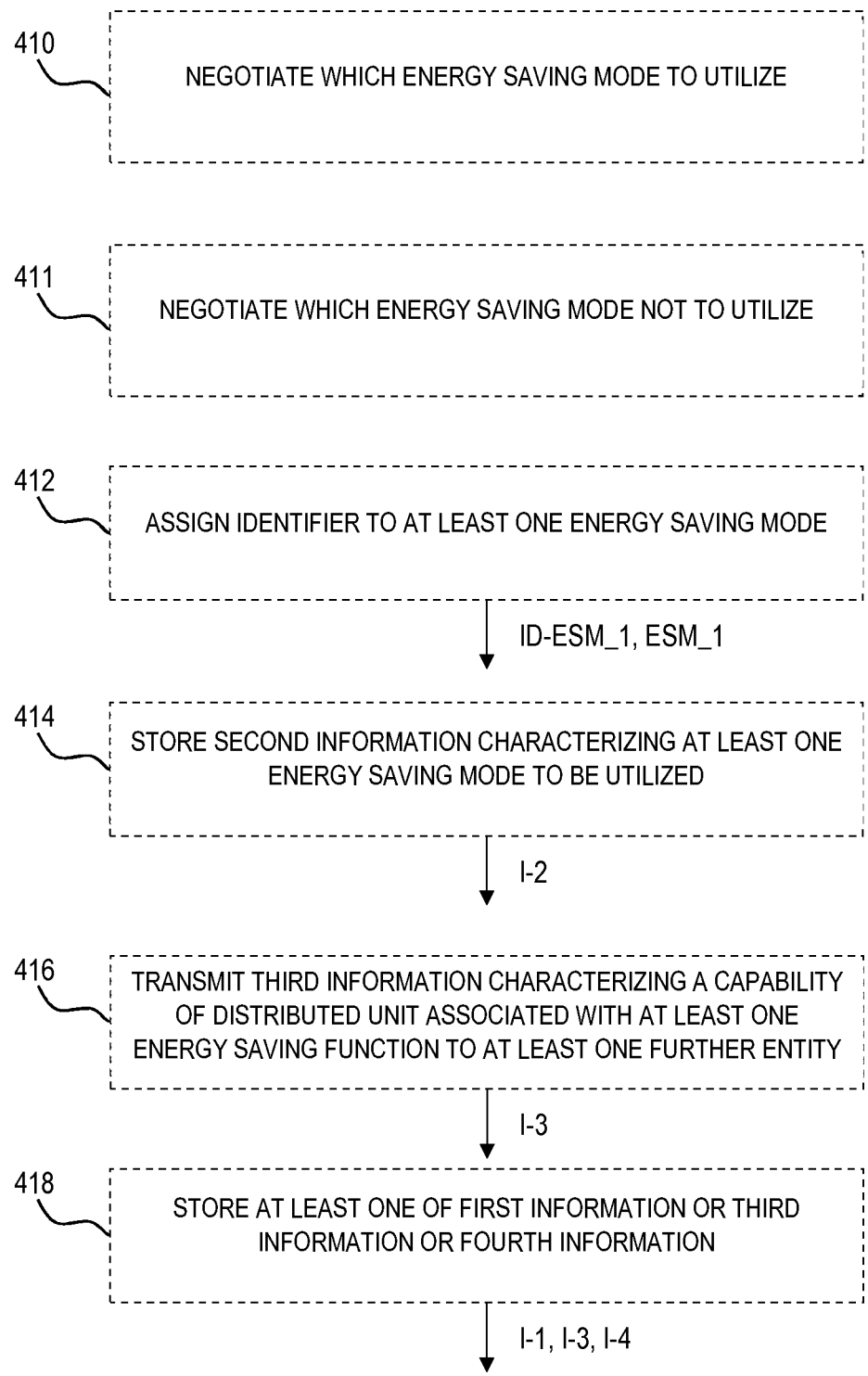
Figure 6:
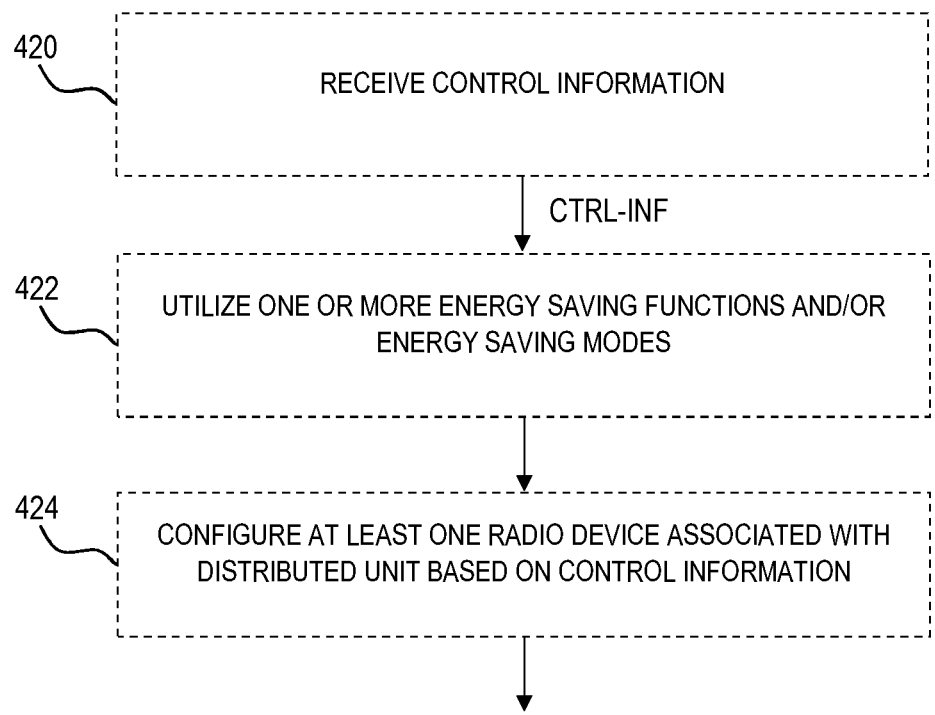
Figure 7:
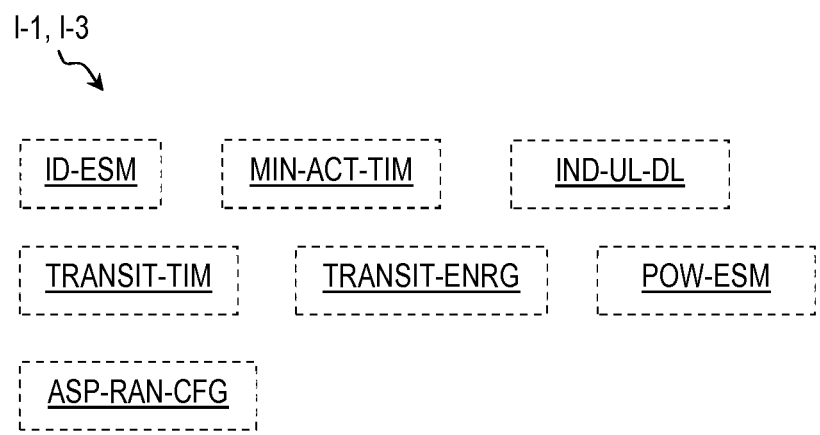
Figure 8A:
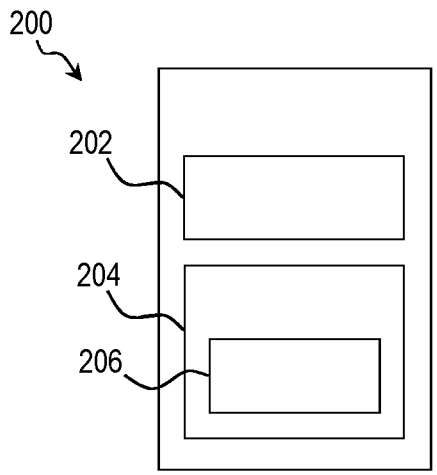
Figure 8B:
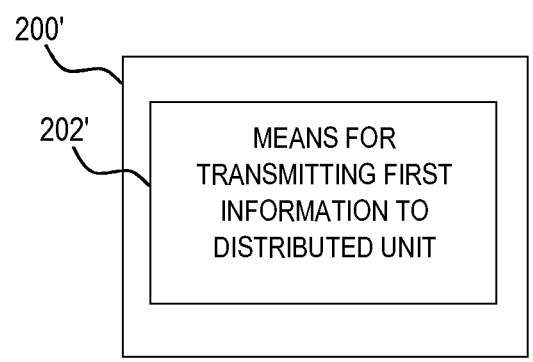
Figure 9:
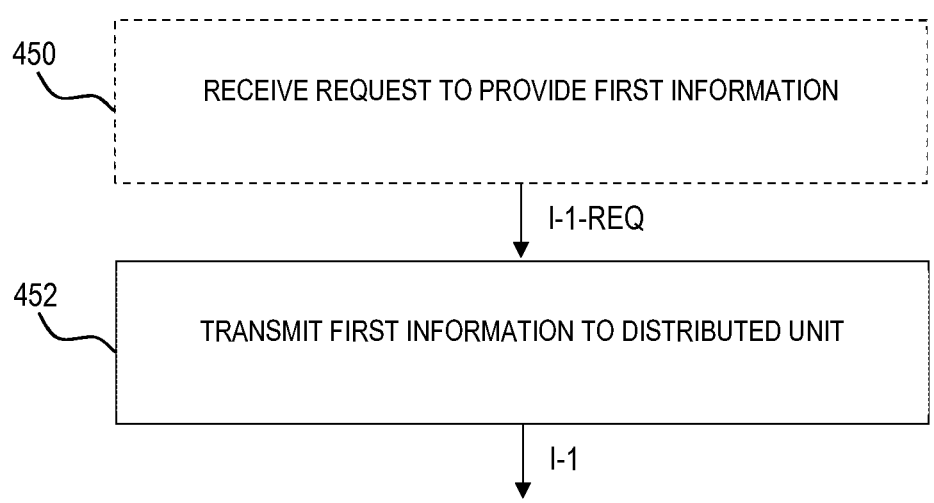
Figure 10:
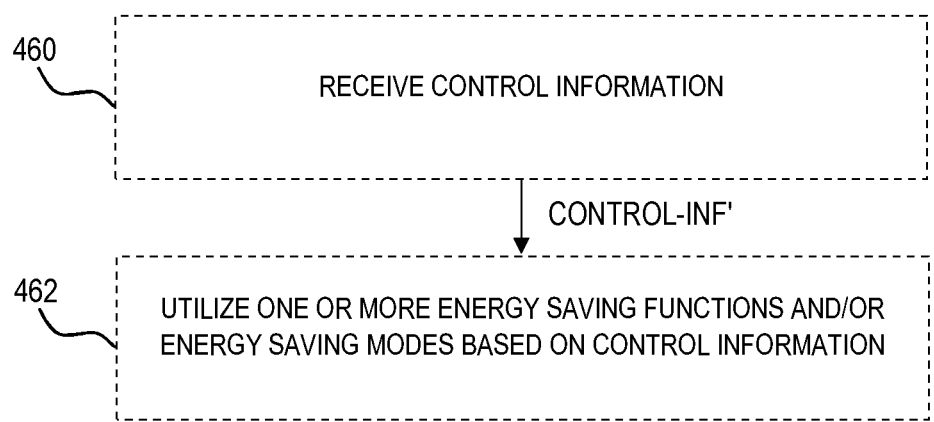
Figure 11A:
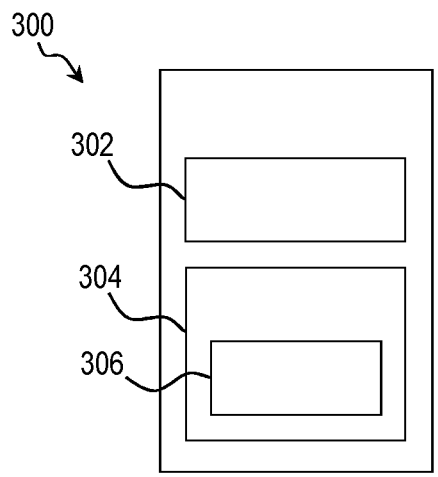
Figure 11B:
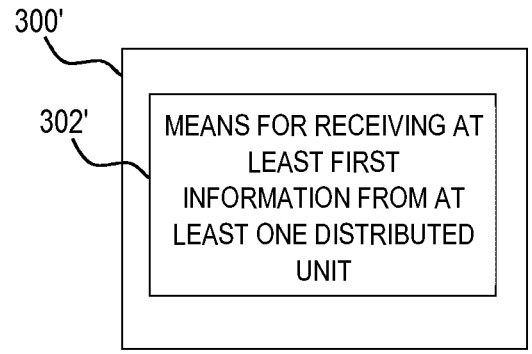
Figure 12:
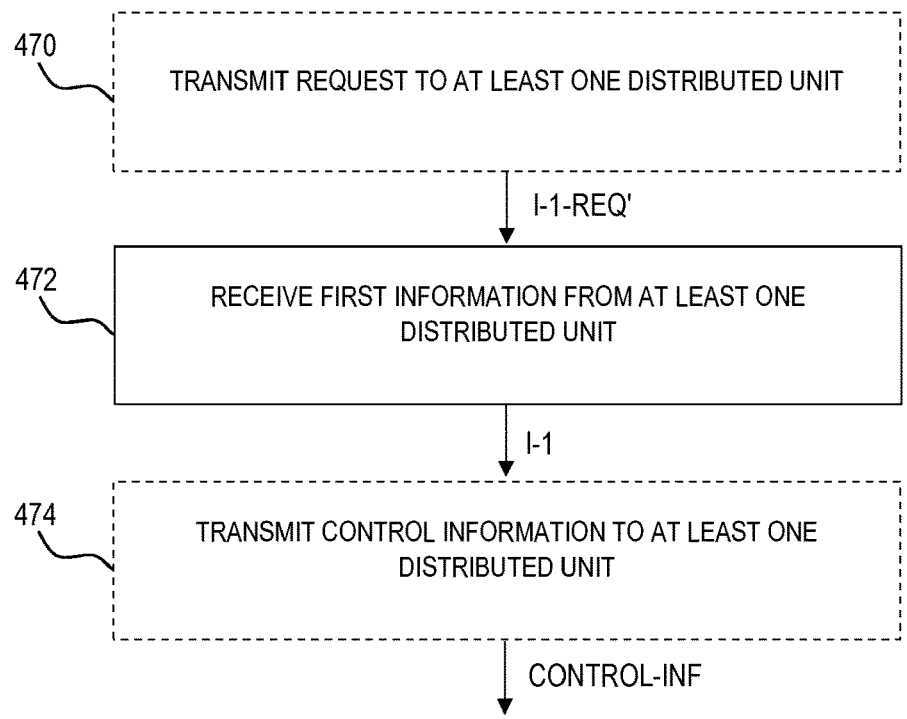
Figure 13:
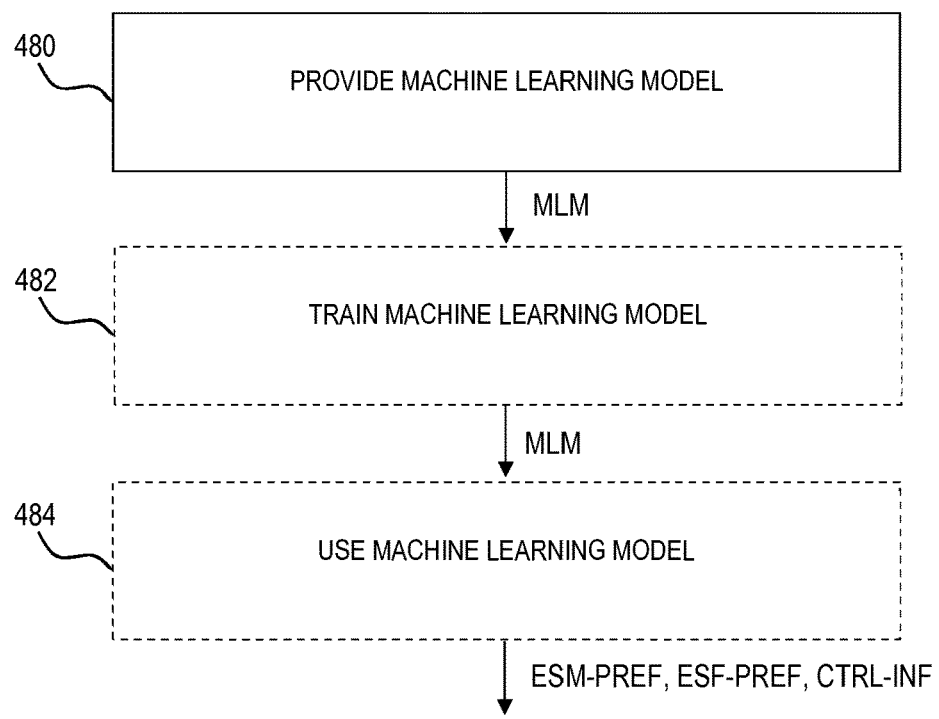
Figure 14:
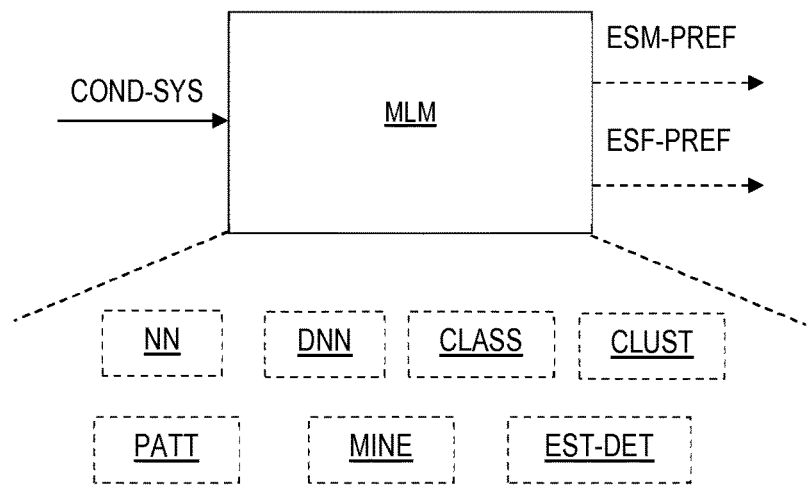
Figure 15:
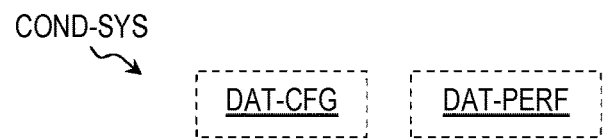
Figure 16:
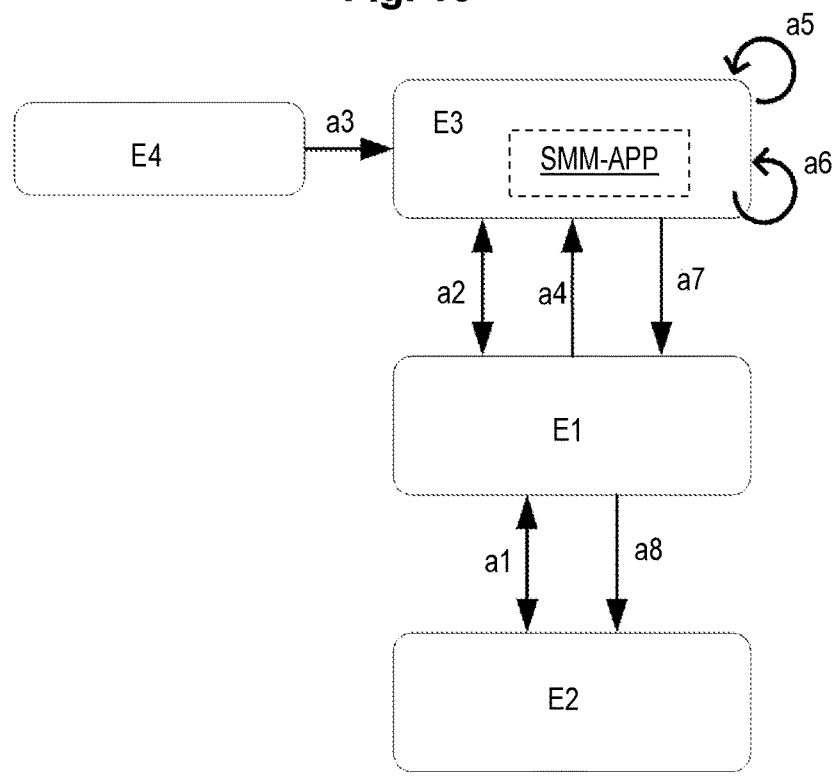
Figure 17:
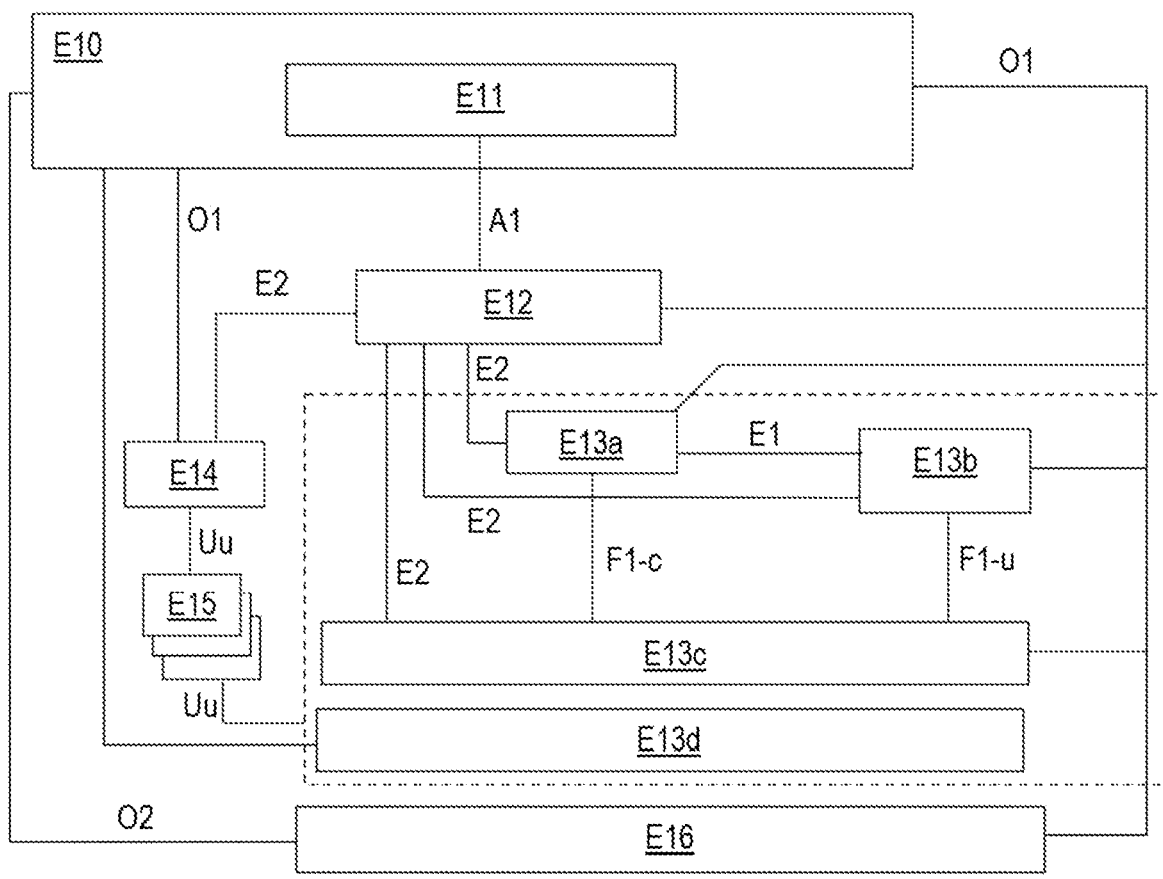
Figure 18:
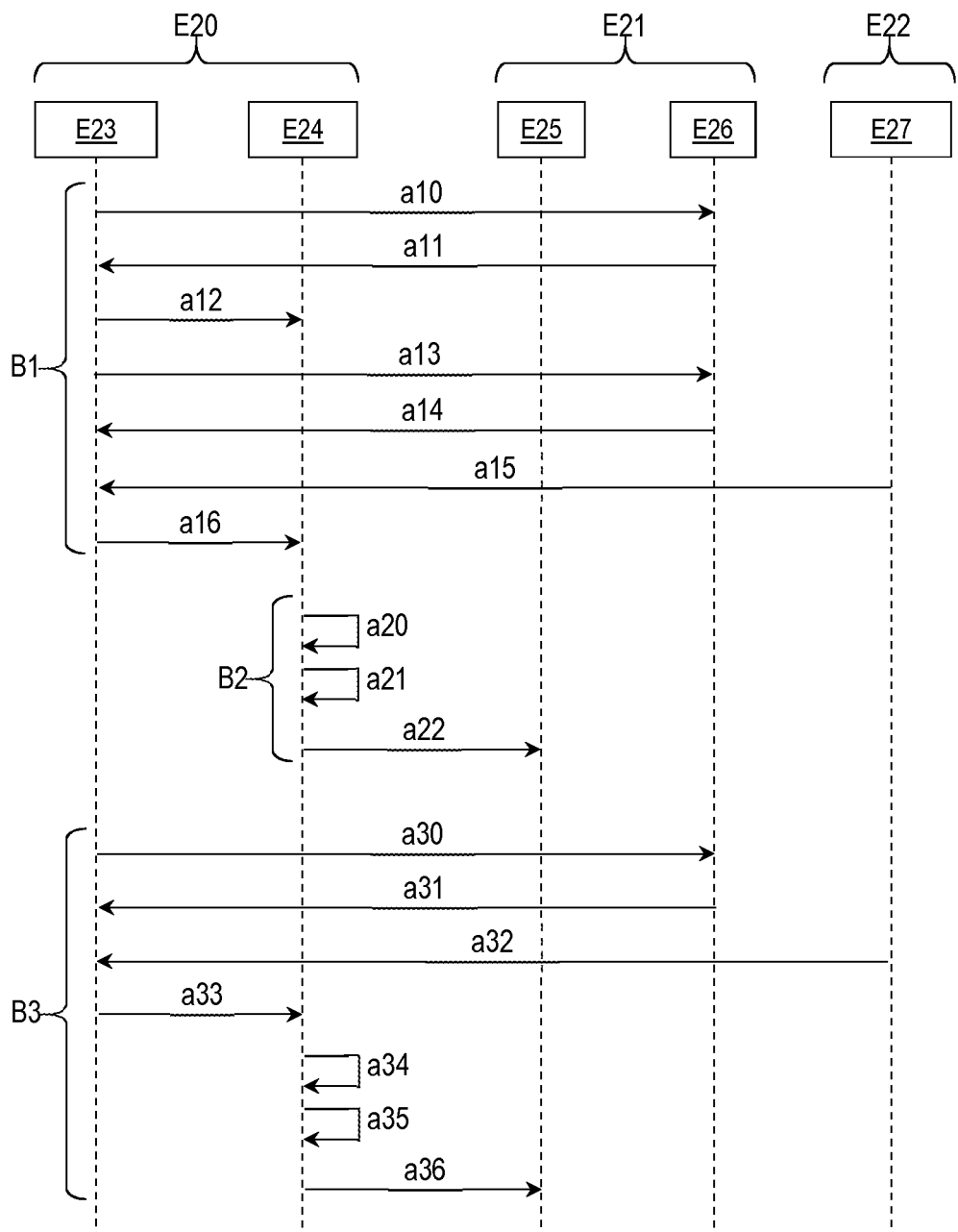
Figure 19:
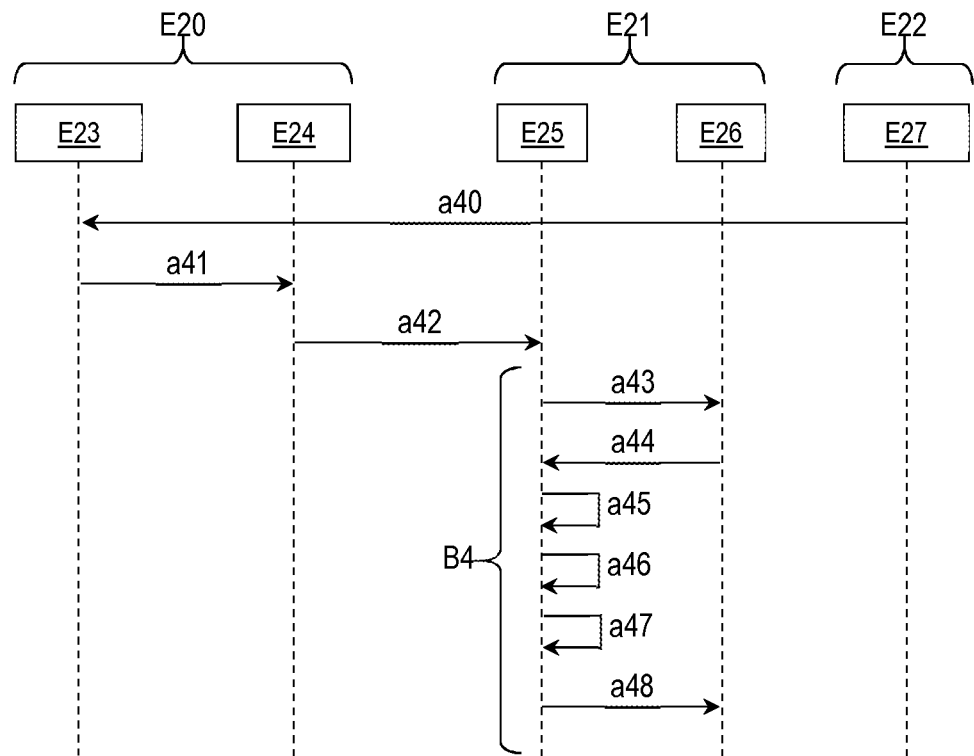
Figure 20:
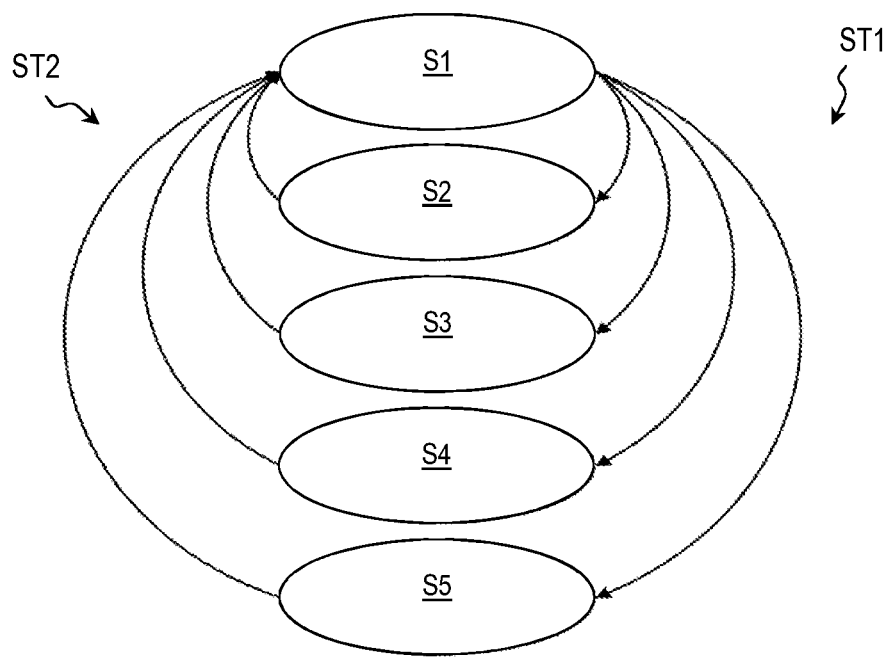
Figure 21:
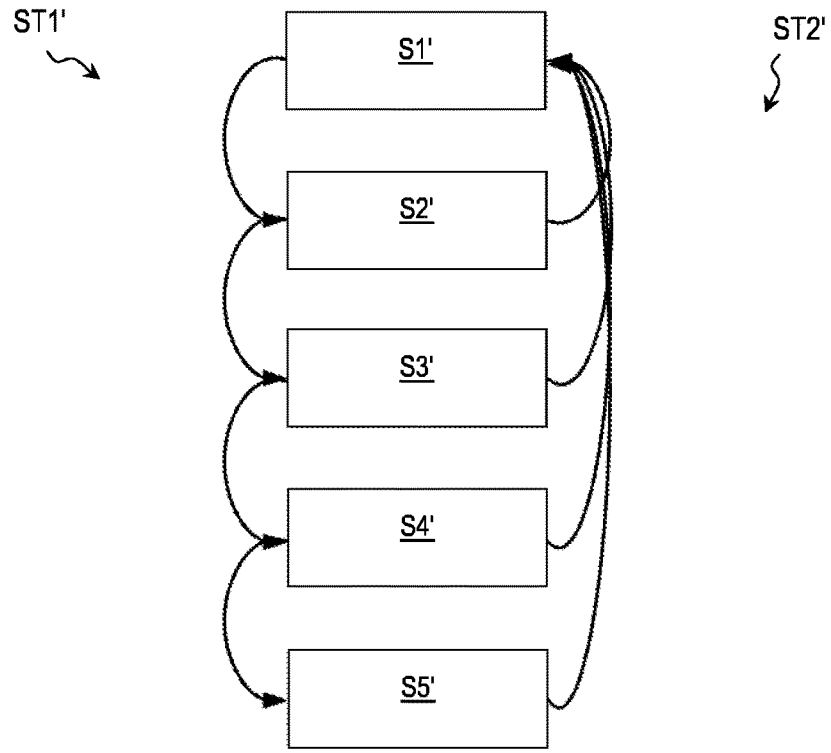
Figure 22:
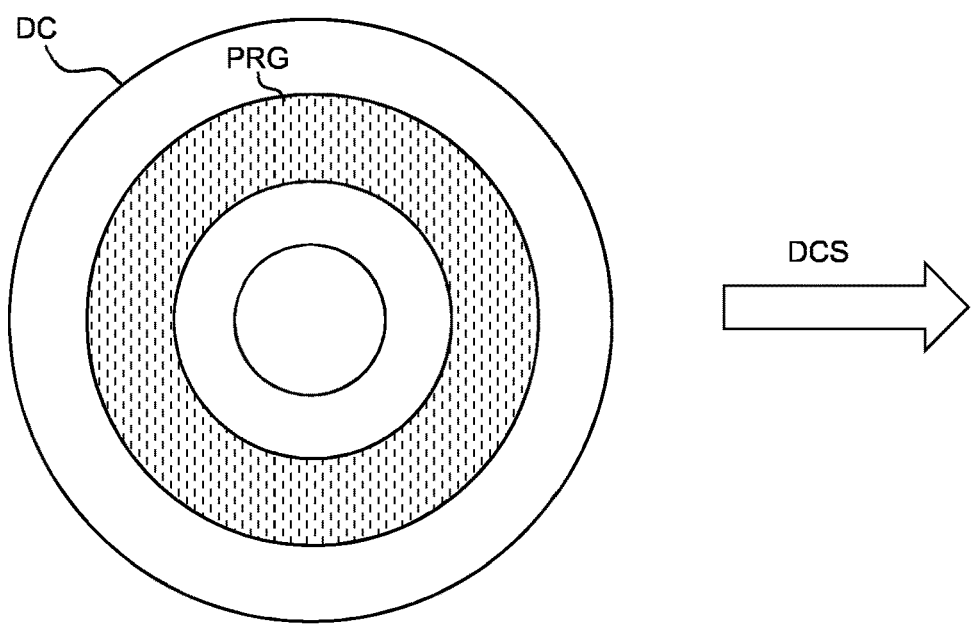

FIG. 1A schematically depicts a simplified block diagram according to some exemplary embodiments, FIG. 1B schematically depicts a simplified block diagram according to some exemplary embodiments, FIG. 2 schematically depicts a simplified block diagram array according to some exemplary embodiments, FIG. 3A schematically depicts a simplified flow chart according to some exemplary embodiments, FIG. 3B schematically depicts a simplified flow chart according to some exemplary embodiments, FIG. 4 schematically depicts a simplified block diagram according to some exemplary embodiments, FIG. 5 schematically depicts a simplified block diagram according to some exemplary embodiments, FIG. 6 schematically depicts a simplified flow chart according to some exemplary embodiments, FIG. 7 schematically depicts a simplified block diagram according to some exemplary embodiments, FIG. 8A schematically depicts a simplified block diagram according to some exemplary embodiments, FIG. 8B schematically depicts a simplified block diagram according to some exemplary embodiments, FIG. 9 schematically depicts a simplified flow chart according to some exemplary embodiments, FIG. 10 schematically depicts a simplified flow chart according to some exemplary embodiments, FIG. 11A schematically depicts a simplified block diagram according to some exemplary embodiments, FIG. 11B schematically depicts a simplified block diagram according to some exemplary embodiments, FIG. 12 schematically depicts a simplified flow chart according to some exemplary embodiments, FIG. 13 schematically depicts a simplified flow chart according to some exemplary embodiments, FIG. 14 schematically depicts a simplified block diagram according to some exemplary embodiments FIG. 15 schematically depicts a simplified block diagram according to some exemplary embodiments, FIG. 16 schematically depicts a simplified block diagram according to some exemplary embodiments, FIG. 17 schematically depicts a simplified block diagram according to some exemplary embodiments, FIG. 18 schematically depicts a simplified signaling diagram according to some exemplary embodiments, FIG. 19 schematically depicts a simplified signaling diagram according to some exemplary embodiments, FIG. 20 schematically depicts a simplified state diagram according to some exemplary embodiments, FIG. 21 schematically depicts a simplified state diagram according to some exemplary embodiments, FIG. 22 schematically depicts a simplified diagram according to some exemplary embodiments.

DESCRIPTION OF SOME EXEMPLARY EMBODIMENTS

Some exemplary embodiments, see for example FIG. 1A, 2, 3A, relate to an apparatus 100 for a distributed unit 12 (FIG. 2) of a communication system 10, the apparatus 100 comprising at least one processor 102, and at least one memory 104 storing instructions 106, the at least one memory 104 and the instructions 106 configured to, with the at least one processor 102, cause the distributed unit (DU) 12 to receive 402 (FIG. 3A) from at least one radio unit (RU) 14 first information I-1 characterizing a capability of the at least one radio unit 12 associated with at least one energy saving function, and, optionally, to transmit 404 the first information I-1 to at least one further entity 16. In some exemplary embodiments, this enables to collect information on the capabilities of the at least one radio unit 14 regarding the at least one energy saving function. In some exemplary embodiments, on this basis, aspects of an operation of the at least one radio unit 14 (and/or of the distributed unit 12 associated with the at least one radio unit 14) may be, e.g. at least temporarily, controlled.

In some exemplary embodiments, FIG. 2, the first information I-1 can be transmitted over an interface A1 enabling a data exchange between the distributed unit 12 and the at least one radio unit 14.

In some exemplary embodiments, FIG. 2, the distributed unit 12 may e.g. form part of a network device, e.g. base station, e.g. gNB, BS, e.g. according to and/or based on some accepted standard and/or architecture such as e.g. 3G, 4G, 5G, 6G, O-RAN (Open Radio Access Network).

As an example, in some exemplary embodiments, the distributed unit 12 may e.g. be associated with, e.g. implement at least some functions of, an O-RAN Distributed Unit, O-DU, e.g. characterizing a, for example logical, node or device hosting RLC (radio link control)/MAC (medium access control)/High-PHY (physical) layers, e.g. based on a lower layer functional split.

In some exemplary embodiments, FIG. 2, the radio unit 14 may e.g. form part of a network device, e.g. base station, e.g. gNB, BS, e.g. according to and/or based on some accepted standard and/or architecture such as e.g. 3G, 4G, 5G, 6G, O-RAN (Open Radio Access Network).

As an example, in some exemplary embodiments, the radio unit 14 may e.g. be associated with, e.g. implement at least some functions of, an O-RAN Radio Unit, O-RU, e.g. characterizing a, for example logical, node or device hosting a Low-PHY layer and radio frequency, RF, signal processing, e.g. based on a lower layer functional split.

In some exemplary embodiments, FIG. 2, the at least one further entity 16 may e.g. be or comprise a RAN Intelligent Controller, RIC, e.g. a near-RT (real-time) RIC or a non-RT RIC.

In some exemplary embodiments, FIG. 3A, the instructions 106, when executed by the at least one processor 102, cause the distributed unit 12 to perform at least one of: a) receiving 400 a request I-1-REQ', e.g. from the at least one further entity 16, e.g. via an interface A2 (FIG. 2), to request 401 the first information I-1 from the at least one radio unit 14, b) requesting 401 the first information I-1 from the at least one radio unit 14, e.g. by transmitting a request I-1-REQ to the at least one radio unit 14.

In some exemplary embodiments, FIG. 4, the first information I-1 comprises at least one of: a) information I-SLEEP-MODES characterizing at least one energy saving mode, for example sleep mode, supported by the at least one radio unit 14, b) information I-ENERGY-SAVING-FEAT characterizing at least one energy saving feature supported by the at least one radio unit 14. In some exemplary embodiments, the first information I-1 may comprises further, e.g. additional, information (not shown).

In some exemplary embodiments, FIG. 3B, the instructions 106, when executed by the at least one processor 102, cause the distributed unit 12 to perform at least one of: a) receiving 400 the request I-1-REQ' to perform at least one of: a2) transmitting 401a third information I-3 characterizing a capability of the distributed unit 12 associated with at least one energy saving function to at least one further entity 14, 16, a3) determining 401b fourth information I-4, which is based on at least one of the first I-1 information and the third information I-3, a4) transmitting 401c the fourth information I-4 to the at least one further entity 14, 16.

In some exemplary embodiments, the transmitting 401c of the fourth information I-4 may e.g. be performed alternatively to transmitting the first information and/or additionally to transmitting the first information.

In some exemplary embodiments, the transmitting 401c of the fourth information I-4 may e.g. be performed alternatively to transmitting the third information and/or additionally to transmitting the third information.

In some exemplary embodiments, one or more aspects of FIG. 3A, 3B may also be combined and/or performed in another sequence than exemplarily depicted by FIG. 3A, 3B. This also applies to all further exemplary embodiments.

In some exemplary embodiments, FIG. 3B, the request I-1-REQ' may e.g. be received by the distributed unit 12, e.g. from a RIC 16. In some exemplary embodiments, FIG. 3B, the request I-1-REQ' may e.g. be used to determine, e.g. query, energy saving capabilities of both the RU 14 and the DU 12.

In some exemplary embodiments, the DU 12 may request the first information I-1 from the at least one RU 14, and may transmit the first information I-1, e.g. together with the third information I-3 and/or in the form of the fourth information I-4, to the at least one further entity, e.g. RIC, 16.

In some exemplary embodiments, the at least one RU 14 and the DU 12 may comprise one or more same or similar energy saving capabilities, e.g. representing a common denominator associated with energy saving capabilities offered by both devices 12, 14, which may e.g. be characterized by the fourth information I-4.

In some exemplary embodiments, FIG. 5, the instructions 106, when executed by the at least one processor 102, cause the distributed unit 12 to perform at least one of: a) negotiating 410 a configuration (e.g., with the at least one radio unit 14 and/or with the at least one further entity 16) which energy saving modes to utilize, b) negotiating 411 a configuration (e.g., with the at least one radio unit 14 and/or with the at least one further entity 16) which energy saving mode not to utilize, c) assigning 412 an identifier ID-ESM_1 to at least one energy saving mode ESM_1, d) storing 414 second information I-2 characterizing at least one energy saving mode to be utilized, e.g. selected from during an operation (e.g., by at least one of the distributed unit 12 and the radio unit 14), e) transmitting 416 third information I-3 characterizing a capability of the distributed unit 12 associated with at least one energy saving function to the at least one further entity 16, f) storing 418 at least one of the first information I-1 or the third information I-3 or the fourth information I-4.

In some exemplary embodiments, the assigning 412 characterizes at least some aspects of a process of composing at least one of DU capabilities (e.g., as characterized by the third information I-3) or combined RU/DU capabilities (e.g., as characterized by the fourth information I-4).

In some exemplary embodiments, the third information I-3 may comprise similar or identical information I-SLEEP-MODES, I-ENERGY-SAVING-FEAT as exemplarily disclosed above with reference to FIG. 4.

In some exemplary embodiments, FIG. 6, the instructions 106, when executed by the at least one processor 102, cause the distributed unit 12 to perform at least one of: a) receiving 420 control information CTRL-INF, e.g. from the at least one further entity 16, characterizing at least one of a1) one or more energy saving functions or a2) one or more energy saving modes to be utilized by at least one of A) the at least one distributed unit 12 or B) at least one radio unit 14 associated with the at least one distributed unit, b) utilizing, e.g. applying or selecting, 422 at least one of b1) the one or more energy saving functions or b2) the one or more energy saving modes, c) controlling 424 at least one radio unit 14 associated with the distributed unit 12 to utilize at least one of c1) the one or more energy saving functions based on the control information CTRL-INF or c2) the one or more energy saving modes based on the control information CTRL-INF.

In some exemplary embodiments, FIG. 7, at least one of the first information I-1 and the third information I-3 and the fourth information I-4 comprises at least one of: a) an identifier ID-ESM associated with at least one energy saving mode, b) a minimum activity time MIN-ACT-TIM associated with the at least one energy saving mode, c) an indicator IND-UL-DL indicating whether the at least one energy saving mode can be used for at least one of c1) a downlink (DL) operation or c2) an uplink (UL) operation, d) at least one transition time TRANSIT-TIM characterizing at least one state transition or mode transition associated with the at least one energy saving mode, e.g. a state transition between two energy saving modes, e) at least one transition energy TRANSIT-ENERG characterizing an energy associated with at least one state transition or mode transition associated with the at least one energy saving mode, e.g. a state transition between two energy saving modes, f) a power consumption POW-ESM associated with the at least one energy saving mode, g) aspects ASP-RAN-CFG of a radio access network configuration.

Further exemplary embodiments, FIG. 1B, relate to an apparatus 100' for a distributed unit 12 of a communication system 10, the apparatus 100' comprising means 102' for receiving 402 from at least one radio unit 14 first information I-1 characterizing a capability of the at least one radio unit 14 associated with at least one energy saving function, and, optionally, for transmitting 404 the first information I-1 (and/or the third information I-3 and/or the fourth information I-4) to at least one further entity 16. In some exemplary embodiments, the means 102' for receiving the first information I-1 from the at least one radio unit 14 comprise at least one processor 102 (FIG. 1A), and at least one memory 104 storing instructions 106, the at least one memory 104 and the instructions 106 configured to, with the at least one processor 102, cause the apparatus 100' to perform the receiving 402 of the first information I-1.

Further exemplary embodiments, FIG. 3A, relate to a method, comprising: receiving 402, by a distributed unit 12 of a communication system 10, from at least one radio unit 14 first information I-1 characterizing a capability of the at least one radio unit 14 associated with at least one energy saving function, and, optionally, transmitting 404, by the distributed unit 12, the first information I-1 (and/or the third information I-3 and/or the fourth information I-4) to at least one further entity 16.

Further exemplary embodiments, FIG. 8A, 9, 2, relate to an apparatus 200 for a radio unit 14 (FIG. 2) of a communication system 10, the apparatus 200 comprising at least one processor 202, and at least one memory 204 storing instructions 206, the at least one memory 204 and the instructions 206 configured to, with the at least one processor 202, cause the radio unit 14 to transmit 452 (FIG. 9) the first information I-1 characterizing a capability of the radio unit 14 associated with at least one energy saving function to a distributed unit 12 of the communication system 10.

In some exemplary embodiments, FIG. 9, the instructions 206, when executed by the at least one processor 202, cause the radio unit 14 to receive 45ß a request I-1-REQ, e.g. from the distributed unit 12, to provide the first information I-1.

In some exemplary embodiments, FIG. 10, the instructions 206, when executed by the at least one processor 202, cause the radio unit 14 to receive control information CTRL-INF', e.g. from the distributed unit 12 (FIG. 2), instructing the radio unit 14 to utilize 462, e.g. apply, at least one of a) one or more energy saving functions or b) one or more energy saving modes, and to utilize, e.g. apply, 462 at least one of c) the one or more energy saving functions or d) the one or more energy saving modes based on the control information CTRL-INF'.

Further exemplary embodiments, FIG. 8B, relate to an apparatus 200' for a radio unit 14 of a communication system 10, the apparatus 200' comprising means 202' for transmitting 452 first information I-1 characterizing a capability of the radio unit 14 associated with at least one energy saving function to at least one distributed unit 12 of the communication system 10. In some exemplary embodiments, the means 202' for transmitting 452 the first information I-1 comprise at least one processor 202 (FIG. 8A), and at least one memory 204 storing instructions 206, the at least one memory 204 and the instructions 206 configured to, with the at least one processor 202, cause the apparatus 200' to perform the transmitting 452 of the first information I-1.

Further exemplary embodiments, FIG. 9, relate to a method, comprising: transmitting 452, by a radio unit 14 of a communication system 10, first information I-1 characterizing a capability of the radio unit 14 associated with at least one energy saving function to at least one distributed unit 12 of the communication system 10.

Further exemplary embodiments, FIG. 11A, 12, relate to an apparatus 300 for a communication system 10 (FIG. 2), the apparatus 300 comprising at least one processor 302, and at least one memory 304 storing instructions 306, the at least one memory 304 and the instructions 306 configured to, with the at least one processor 302, cause the apparatus 300 to receive 472 from at least one distributed unit 12 first information I-1 characterizing a capability associated with at least one energy saving function of at least one radio unit 14 (FIG. 2) associated with the at least one distributed unit 12.

In some exemplary embodiments, FIG. 12, the instructions 306, when executed by the at least one processor 302, cause the apparatus 300 to transmit 470 a request I-1-REQ' to the at least one distributed unit 12 to request at least the first information I-1 from the at least one radio unit 14 associated with the at least one distributed unit 12.

In some exemplary embodiments, FIG. 12, the instructions 306, when executed by the at least one processor 302, cause the apparatus 300 to transmit 474 to the at least one distributed unit 12 control information CTRL-INF characterizing at least one of a) one or more energy saving functions or b) one or more energy saving modes, to be utilized, e.g. applied or selected, by at least one of A) the at least one distributed unit 12 or B) the at least one radio unit 14 associated with the at least one distributed unit 12.

In some exemplary embodiments, FIG. 13, the instructions 306, when executed by the at least one processor 302, cause the apparatus 300 to provide 480 a machine learning model MLM, see also FIG. 14, that is at least one of a) trainable or b) configured, e.g. trained, to predict at least one of A) at least one preferred energy saving mode or B) at least one preferred energy saving feature based on conditions COND-SYS (FIG. 14) associated with the communication system 10.

In some exemplary embodiments, the at least one preferred energy saving mode and/or the at least one preferred energy saving feature may e.g. be preferred according to at least one, e.g. predetermined, criterion, such as e.g. an overall power consumption. In other words, in some exemplary embodiments, a preferred energy saving mode may be an energy saving mode which results in a best, e.g. lowest, overall power consumption, e.g. as determined by the machine learning model MLM.

In some exemplary embodiments, FIG. 14, the machine learning model MLM comprises at least one of: a) a neural network NN, e.g. artificial neural network, b) a deep neural network DNN, c) a classifier CLASS, d) a clustering method CLUST, e) a pattern detection technique PATT, f) a data mining method MINE, g) an estimation and detection method EST-DET.

In some exemplary embodiments, FIG. 15, the conditions COND-SYS associated with the communication system 10 comprise at least one of: a) network configuration related data DAT-CFG associated with the communication system 10, b) network performance related data DAT-PERF associated with the communication system 10, e.g. at least one of b1) load, b2) energy consumption, b3) energy efficiency, b4) performance management data, b5) prediction data.

In some exemplary embodiments, the prediction data may e.g. include at least one of: a) load prediction, b) mobility prediction associated with terminal devices, e.g. user equipment, UE, c) QoS (quality of service) prediction, d) energy consumption prediction data.

In some exemplary embodiments, FIG. 13, the instructions 306, when executed by the at least one processor 302, cause the apparatus 300 to train 482 the machine learning model MLM based on the conditions COND-SYS associated with the communication system 10.

In some exemplary embodiments, FIG. 13, the instructions 306, when executed by the at least one processor 302, cause the apparatus 300 to use 484 the machine learning model MLM based on the conditions COND-SYS associated with the communication system 10, e.g. for providing the control information CTRL-INF, e.g. to control, e.g. jointly control, energy saving modes, e.g. sleep modes, of at least some components 12, 14, 16 of the communication system 10.

Further exemplary embodiments, FIG. 11B, relate to an apparatus 300' for a communication system 10, the apparatus 300' comprising means 302' for receiving 472 from at least one distributed unit 12 at least first information I-1 characterizing a capability associated with at least one energy saving function of at least one radio unit 14 associated with the at least one distributed unit 12. In some exemplary embodiments, the means 302' for receiving comprise at least one processor 302 (FIG. 11A), and at least one memory 304 storing instructions 306, the at least one memory 304 and the instructions 306 configured to, with the at least one processor 302, cause the apparatus 300' to perform the receiving 472 of the first information I-1.

Further exemplary embodiments, FIG. 12, relate to a method, comprising: receiving 472 from at least one distributed unit 12 at least first information I-1 characterizing a capability associated with at least one energy saving function of at least one radio unit 14 associated with the at least one distributed unit 12.

Further exemplary embodiments, FIG. 2, relate to a distributed unit 12 for a communication system 10, comprising at least one apparatus 100, 100' according to the embodiments. In some exemplary embodiments, the apparatus 100, 100' or its functionality, respectively, may be integrated into the distributed unit 12. In some exemplary embodiments, however, the apparatus 100, 100' or its functionality, respectively, is not integrated into the distributed unit 12.

Further exemplary embodiments, FIG. 2, relate to a radio unit 14 for a communication system 10, comprising at least one apparatus 200, 200' according to the embodiments. In some exemplary embodiments, the apparatus 200, 200' or its functionality, respectively, may be integrated into the radio unit 14. In some exemplary embodiments, however, the apparatus 200, 200' or its functionality, respectively, is not integrated into the radio unit 14.

Further exemplary embodiments, FIG. 2, relate to a radio access network, RAN, controller, for example a radio access network intelligent controller, RIC, 16 comprising at least one apparatus 300, 300' according to the embodiments. In some exemplary embodiments, the apparatus 300, 300' or its functionality, respectively, may be at least partly integrated into the RIC 16. In some exemplary embodiments, however, the apparatus 300, 300' or at least some parts of its functionality, respectively, are not integrated into the RIC 16. In some exemplary embodiments, at least some aspects of the apparatus 300, 300' or its functionality, respectively, may be at least partly integrated into the DU 12.

Further exemplary embodiments, FIG. 2, relate to a communication system 10, e.g. communication network, comprising at least one of the following elements: a) an apparatus 100, 100', 200, 200', 300, 300' according to the embodiments, b) a distributed unit 12 according to the embodiments, c) a radio unit 14 according to the embodiments, d) a radio access network controller 16 according to the embodiments.

In some exemplary embodiments, as exemplarily depicted by FIG. 2, more than one distributed unit 12, 12' may be provided. In some exemplary embodiments, at least one further distributed unit 12' may comprise a configuration similar or identical to the distributed unit 12.

In some exemplary embodiments, as exemplarily depicted by FIG. 2, more than one radio unit 14, 14' may be provided. In some exemplary embodiments, at least one further radio unit 14' may comprise a configuration similar or identical to the radio unit 14.

In some exemplary embodiments, as exemplarily depicted by FIG. 2, more than one RIC 16, 16' may be provided. In some exemplary embodiments, at least one further RIC 16' may comprise a configuration similar or identical to the RIC 16. In some exemplary embodiments, a functionality of the apparatus 300, 300' may e.g. be distributed, e.g. split, between different RIC 16, 16' of the communication system 10.

In the following, further exemplary aspects and embodiments are discussed which may, according to further exemplary embodiments, be combined with at least one of the exemplary embodiments discussed above.

In some exemplary embodiments, using the principle according to the embodiments, an energy saving mode, e.g. sleep mode, control and/or guidance may be provided, e.g. for at least one distributed unit 12 (FIG. 2) and/or at least one radio unit 14 associated with the at least one distributed unit 12. In some exemplary embodiments, there is no need for extensive knowledge e.g. about how individual sleep modes/energy saving features that may be provided within the respective distributed unit 12 and/or radio unit 14.

In some exemplary embodiments, a capability exchange related to supported sleep modes and/or implemented energy saving features, e.g. including mode specific parameters (e.g., transition times between modes and the minimum sleep time of a mode) is enabled, e.g. over a fronthaul interface A1 (FIG. 2) between the distributed unit 12 and the radio unit 14, e.g. by means of exchanging at least one of the first information I-1 or the third information I-3.

In some exemplary embodiments, at least one of the distributed unit 12 or the radio unit 14 may allocate, e.g. provide, identifiers, e.g. energy saving mode identifiers, e.g. sleep mode identifiers (SMID), which in some exemplary embodiments may e.g. correspond to specific sleep modes (e.g., micro sleep, light sleep, deep sleep) or one or more combined energy saving features of at least one of the distributed unit 12 and the radio unit 14.

In some exemplary embodiments, e.g. during a configuration, mode specific parameters associated to the identifiers, e.g. SMID, may e.g. be communicated, e.g. from the radio unit 14 to the distributed unit 12, and from the distributed unit 12 to the RIC 16, and may e.g. be stored in at least some of these entities 12, 14, 16.

In some exemplary embodiments, the identifiers, e.g. SMIDs, supported by at least one radio unit 14 may e.g. be a subset of identifiers, e.g. SMIDs, supported by at least one distributed unit 12.

In some exemplary embodiments, e.g. during operation, the radio intelligent controller 16 may e.g. provide control and/or guidance to the at least one distributed unit 12 on which identifiers, e.g. SMIDs, to operate in or to activate. In some exemplary embodiments, the control and/or guidance may e.g. be provided using the control information CTRL-INF, see, for example, block 420 of FIG. 6 and block 474 of FIG. 12.

FIG. 16 schematically depicts a simplified block diagram according to some exemplary embodiments. Element E1 symbolizes a distributed unit, DU, e.g. similar to element 12 of FIG. 2. Element E2 of FIG. 16 symbolizes a radio unit, RU, e.g. similar to element 14 of FIG. 2. Element E3 symbolizes a RIC, e.g. similar to element 16 of FIG. 2.

In some exemplary embodiments, a sleep mode management, SMM, application SMM-APP can e.g. be executed by the RIC 16. In some exemplary embodiments, the sleep mode management application SMM-APP can e.g. perform at least some aspects associated with a functionality of the apparatus 300, 300' explained above.

Element E4 of FIG. 16 symbolizes optional applications, which may e.g. be configured to predict and/or collect data that may optionally be used by the RIC 16, e.g. by the sleep mode management application SMM-APP.

In some exemplary embodiments, three stages or modes of operation may be provided: a) a configuration stage, b) a training stage, c) an operating stage.

In some exemplary embodiments, at least one of the following aspects is provided, e.g. performed, during the configuration stage. The RU E2 and the DU E1, and the DU E1 and the RIC E3 exchange capability information, such as e.g. supported sleep modes/energy saving features, see for example the double arrows a1, a2 of FIG. 16 (e.g., using the first information I-1). In some exemplary embodiments, the RU E2 and the DU E1, and/or the DU E1 and the RIC E3 negotiate on which sleep modes to utilize (and/or not to utilize), e.g. in the future, and assign identifiers, e.g. SMIDs, to those sleep modes which will be utilized, e.g. used. In some exemplary embodiments, details about the to-be-utilized sleep modes may be exchanged, see the double arrows a1, a2, and may e.g. stored by at least one of the components E1, E2, E3. In some exemplary embodiments, for example two or more, e.g. separate, sets of identifiers, e.g. SMIDs, can be used: i) a first set of identifiers, e.g. SMIDs, for an exchange and a negotiation between the RU E2 and the DU E1, and ii) a second set of identifiers, e.g. SMIDs, for an exchange and a guidance/control between the DU E1 and the RIC 16.

In some exemplary embodiments, at least one of the following aspects is provided, e.g. performed, during the training stage: The SMM application SMM-APP, which is hosted in the RIC E3, collects network configuration and performance related data (including, e.g., load, energy consumption/efficiency, and other performance management data, and, optionally, prediction data), see the arrows a3, a4. The SMM application SMM-APP may e.g. train the machine learning (ML) model MLM (FIG. 14), see arrow a5, e.g. to predict a set of preferred (e.g., optimal) sleep mode/energy saving features to be activated based on the network conditions.

In some exemplary embodiments, at least one of the following aspects is provided, e.g. performed, during the operating stage: The SMM application SMM-APP collects data, e.g. the same set of data as in the training stage, see arrows a3, a4, and feeds it as input data into the ML model MLM, and infers, by means of the ML model MLM, see arrow a6, a recommended set of identifiers, e.g. SMIDs, to configure in the DU E1, see arrow a7, e.g. based on the current network conditions and, if available, predictions (collected according to arrows a3, a4). Information characterizing the recommended set of identifiers, e.g. SMIDs, is then communicated towards the DU E1, e.g. in form of a guidance or configuration, see arrow 7 (also cf. the control information CTRL-INF explained above). Further, the DU E1 may configure its associated RU E2, see arrow a8, e.g. according to the configured/selected sleep mode/energy saving feature, e.g. based on the information obtained according to arrow a7.

In some exemplary embodiments, the method may involve more than one DU E1 and/or more than one RU E2 and/or more than one RIC E3 (see, for example, the elements 12, 12', 14, 14', 16, 16') of FIG. 2, in which case a configuration may e.g. be performed between more than one, e.g. all, connected pairs of RUs and DUs, and, for example, all DUs and at least one RIC.

In some exemplary embodiments, data may be collected, e.g. by the RIC E3, e.g. by the application SMM-APP, from one or more, e.g. all, DUs (e.g., respective first information), and the training of the ML model MLM may e.g. be performed jointly, e.g. for all DUs. In some exemplary embodiments, the sets of identifiers, e.g. SMIDs, may be separate, e.g. for each DU. In some exemplary embodiments, e.g. in the operating stage, the sleep mode configuration/guidance (e.g., using the control information CTRL-INF) may be performed jointly, e.g. for all DUs, or for a subset of the DUs, which e.g. enables to achieve a global optimization, e.g. regarding energy consumption.

Optionally, in some exemplary embodiments, the operating stage may e.g. include additional training of the ML model MLM. In other words, in some embodiments, the ML model MLM may e.g. be updated during the operating stage, e.g. using data which is collected during the operation.

In some exemplary embodiments, the SMM application SMM-APP may receive, e.g. take, at least one of the following inputs:
1. In the configuration phase, the SMM application SMM-APP may e.g. receive and store (at least temporarily) sleep mode/energy saving feature related data, such as SMIDs, minimum sleep durations of at least one, e.g. each, sleep mode, transition times between sleep modes (e.g., pairwise) or the active mode and the sleep modes, and, for example, whether a sleep mode is applicable to uplink and/or downlink.
2. In some exemplary embodiments, the SMM application SMM-APP may e.g. receive and store (at least temporarily) network energy efficiency performance data, which may include, but is not limited to, energy consumption related data (e.g., Tx (transmit) and Rx (receive) power values, temperature, NF energy consumption values) or energy efficiency related data (e.g., energy consumption over data volume). In some exemplary embodiments, the SMM application SMM-APP may e.g. receive and store (at least temporarily) at least some of the Power, Energy and Environmental measurements as e.g. defined by 3GPP TS28.552. In some exemplary embodiments, the SMM application SMM-APP may e.g. receive and store (at least temporarily) Energy Efficiency and Energy Consumption KPIs (key performance indicators) as e.g. defined by 3GPP TS28.554, clause 6.7.
3. In some exemplary embodiments, the SMM application SMM-APP may e.g. receive and store (at least temporarily) network radio performance data, which may include, but is not limited to, cell-related data (e.g., at least one of cell ID, used carriers, radio unit and/or antenna array configuration, employed beam pattern configuration in case of (massive) MIMO, cell-carrier mapping, carrier-HW mapping), load-related data (e.g., PRB (physical resource block) utilization, cell load statistics, DL/UL throughput values, GBR (guaranteed bit rate) and/or non-GBR and/or PDCCH (physical downlink control channel) load values), UE performance related data.
4. In some exemplary embodiments, the SMM application SMM-APP may e.g. receive and store (at least temporarily) network performance prediction data, e.g., from other applications E4 (FIG. 16). In some exemplary embodiments, the network performance prediction data may include, e.g., at least one of load prediction, UE mobility prediction, QOS prediction, energy consumption prediction data.

In some exemplary embodiments, an output of the method according to the embodiments, as e.g. provided by the ML model MLM, is a sleep mode/energy saving feature or a list of (e.g., preferred) sleep modes/energy saving features, which, in some exemplary embodiments, may e.g. be provided to at least one DU E1 (FIG. 16), e.g. as a guidance and/or as a direct configuration, and which may e.g. be a function of the inputs to the SMM application SMM-APP.

In some exemplary embodiments, e.g. alternatively, a highest level of sleep mode or lowest level of sleep mode that is allowed to be used is provided to the at least one DU E1. In some exemplary embodiments, the DU E1 may e.g. select, e.g. dynamically, e.g. within a range and/or within respective limits of sleep modes/energy saving features.

While in some conventional approaches, specific sleep modes may be agreed upon or standardized, some exemplary embodiments do not require a kind of algorithm to be known or even to be specified. In some exemplary embodiments, a minimum set of characteristics e.g. related to specific sleep modes of the components E1, E2 is known, which e.g. enables an external algorithm to learn how such modes are applied in the best manner.

In some exemplary embodiments, the DU E1 (FIG. 16) may, e.g. immediately, apply an energy saving mode, e.g. sleep mode, controlled and/or recommended by the RIC E3 and/or might apply the energy saving mode with a delay.

In some exemplary embodiments, the DU E1 might for instance need to complete some procedure, e.g. before applying or switching a sleep mode. In some exemplary embodiments, once the mode switching or application of the respective mode is completed, a confirm message may be sent, e.g. to the RIC E3.

In some exemplary embodiments, e.g. if/when the DU E1 changes its state with respect to sleep modes (i.e., activates or deactivates one or more sleep modes/energy saving features), it may optionally configure or reconfigure the at least one RU E2.

In the following, further aspects and exemplary embodiments related to architecture options, e.g. for implementing the principle according to the embodiments, are disclosed, which may be combined with one or more exemplary embodiments as explained above.

In some exemplary embodiments, a sleep mode management, e.g. in the form of the SMM application SMM-APP (FIG. 16), may, e.g. depending on a specific architecture of the communication system 10 (FIG. 2), be hosted in one or more different entities.

In some exemplary embodiments, the functionality of the sleep mode management, e.g. in the form of the SMM application SMM-APP (FIG. 16), may be split into several portions, which may e.g. individually be distributed to different entities of the communication system 10.

In some exemplary embodiments, the functionality of the sleep mode management, e.g. in the form of the SMM application SMM-APP (FIG. 16), may, e.g. completely, be provided within one entity of the communication system 10, such as the RIC E3.

In some exemplary embodiments, the principle according to the embodiments may e.g. be implemented within an O-RAN (Open Radio Access Network) architecture, wherein, according to further exemplary embodiments, different architecture variations, e.g. of intelligent DU/RU sleep mode control/guidance according to exemplary embodiments, may be envisioned.

In this regard, FIG. 17 schematically depicts a simplified block diagram according to some exemplary embodiments. Element E10 symbolizes a Service Management and Orchestration Framework. Element E11 symbolizes a non-RT RIC, which may e.g. host one or more rApps, e.g. applications that do not require real-time or near real-time execution, e.g. on timescales less than one second. Rather, at least some rApps may e.g. be executed on timescales of greater than one second, e.g. 30 seconds or more. Element E12 symbolizes a near-RT RIC, which may e.g. host one or more xApps, e.g. applications that may require real-time or near real-time execution, e.g. on timescales less than one second. Element E13a symbolizes an O-CU-CP (O-RAN Central Unit-Control Plane), e.g. a, for example logical, node e.g. hosting an RRC and, for example, a control plane part of a PDCP (Packet Data Convergence Protocol). Element E13b symbolizes an O-CU-UP (O-RAN Central Unit-User Plane), e.g. a, for example logical, node e.g. hosting a user plane part of the PDCP, and, optionally, a SDAP (Service Data Adaptation Protocol). Element E13c symbolizes an O-DU (O-RAN Distributed Unit), e.g. a, for example logical, node hosting RLC/MAC/High-PHY layers, e.g. based on a lower layer functional split. Element E13d symbolizes an O-RU (O-RAN Radio Unit), e.g. a, for example logical, node hosting e.g. Low-PHY layer and radio frequency processing, e.g. based on a lower layer functional split. In some exemplary embodiments, the O-RU is similar regarding its functionality to a transmission and reception point, TRP, or a remote radio head, RRH, e.g. according to some accepted 3GPP standard. Element E14 symbolizes an O-eNB, e.g. for including aspects of a 4G/LTE base station. Element E15 symbolizes one or more terminal devices, e.g. UE. Element E16 symbolizes an O-Cloud, e.g. a cloud platform of the exemplarily depicted O-RAN architecture of FIG. 17.

In some exemplary embodiments, the components of the exemplarily depicted O-RAN architecture of FIG. 17 can be connected with each other using one or more interfaces as e.g. defined by some accepted standard, e.g. an O-RAN standard. These interfaces are e.g. known to a man skilled in the art and are thus not explained in further detail in the present context.

In some exemplary embodiments, at least one base station BS (FIG. 2) of the communication system 10 may use a, for example fully, aggregated architecture.

In some exemplary embodiments, at least one base station BS (FIG. 2) of the communication system 10 may use one or more different types, e.g. flavors, of split, e.g. disaggregated, architectures, such as e.g.:

a) a split into one or more RUs and at least one DU and a centralized unit (CU) ("RU+DU+CU"),
b) a split into one or more RUs and a combined unit for DU and CU ("RU+DU/CU"),
c) one or more combined units comprising RU and DU, and at least one CU ("RU/DU+CU").

In some exemplary embodiments, the principle according to the embodiments can be applied to RU/DU split architectures, e.g. with RUs and DUs from different vendors.

In some exemplary embodiments, FIG. 17, the SMM application SMM-APP (also see FIG. 16), can e.g. be hosted in an rApp of the Non-RT RIC E11 (FIG. 17) or an xApp of the Near-RT RIC E12.

In some exemplary embodiments, in case of an AI/ML based approach, e.g. using the machine learning model MLM (FIG. 14) according to some embodiments, training and inference related to the machine learning model MLM may e.g. be mapped to (e.g., performed by) different locations or entities of the architecture.

In some exemplary embodiments, FIG. 17, the Non-RT RIC E11 and the Near-RT RIC E12 may e.g. both host each of the functions related to training and/or inference of the machine learning model MLM, or, e.g. alternatively, the functions functionalities related to training and/or inference of the machine learning model MLM functionalities may be split across different entities, e.g. locations, E11, E12.

In some exemplary embodiments, FIG. 17, a functionality for training of the ML model MLM (see, for example, also exemplary block 482 of FIG. 13) is hosted in the Non-RT RIC E11, and the training may e.g. be performed based on data retrieved from the O-DU E13c, e.g. via an O1 interface.

In some exemplary embodiments, a more central location of the training functionality may be preferred, e.g. since an amount of available data may be larger. Thus, in some exemplary embodiments, the machine learning model MLM may be provided by a vendor.

In some exemplary embodiments, e.g. once a training, e.g. initial training, of the machine learning model MLM is completed, the ML model MLM may e.g. be deployed, e.g. in the Near-RT RIC E12, e.g. via the O1 interface.

In some exemplary embodiments, performing an inference (see, for example, also block 484 of FIG. 13) at the Near-RT RIC E12 (FIG. 17) may be preferred, e.g. since it is located closer to the Radio Access Network associated with the O-RU E13d. In these exemplary embodiments, data may be available faster and potentially with more detail, e.g. over an E2 interface. In these exemplary embodiments, also, a faster adaptation may be possible.

In some exemplary embodiments, FIG. 17, performing a training of the ML model MLM at (e.g., by) the Non-RT RIC E11 and performing an inference (e.g., using the ML model) at (e.g., by) the Near-RT RIC E12 is proposed, which may e.g. result in a functional split among entities, some exemplary aspects of which are explained in further detail below.

In some exemplary embodiments, FIG. 17, at least one of the following aspects a), b), c), d), e) may be performed or addressed by at least one of the Service Management and Orchestration, SMO, Framework E10 or the Non-RT RIC E11:

a) Retrieve at least one of a1) performance indicators (e.g., incl. Energy Efficiency KPIs), a2) measurement reports and/or RAN configurations (e.g. the number of supported sleep modes/energy saving features in O-DU incl. transition times etc.), e.g. from E2 nodes, e.g. an O-DU E13c, e.g. in a disaggregated architecture, e.g.

via an O1 interface, e.g. for the purpose of at least one of AI (artificial intelligence)/ML model training (see, for example, block 482 of FIG. 13) or performance monitoring.

b) Collect enrichment information, e.g. from application servers or associated applications E4, and associate enrichment information with collected measurements and configurations, c) Perform AI/ML model training and deployment, d) Perform AI/ML model performance monitoring, and, optionally, further training or re-training, e) Send enrichment information to the Near-RT RIC E12, e.g. for inference, e.g. via an A1 interface.

In some exemplary embodiments, FIG. 17, at least one of the following aspects f), g), h), i), j) may be performed or addressed by the Near-RT RIC E12:

f) Support AI/ML model deployment, e.g. from the Non-RT RIC E11, e.g. via the O1/O2 interface, g) Subscribe and/or retrieve at least one of g1) performance indicators, g2) failure indicators, g3) measurement reports, g4) UE context information, g5) RAN configurations, e.g. from E2 nodes E13c, e.g. via the E2 interface, e.g. for the purpose of Sleep Mode/Energy Saving optimization, h) Retrieve enrichment information, e.g. from the Non-RT RIC E11, e.g. via the AI interface, and associate the enrichment information with collected measurements and configurations, i) Perform AI/ML model inference (see, for example, also block 484 of FIG. 13), j) Send at least one of a control message or policy message for Sleep Mode/Energy Saving optimization (see, for example, also the control information CTRL-INF of FIG. 6) to E2 nodes E13c, e.g. via the E2 interface.

In some exemplary embodiments, FIG. 17, at least one of the following aspects k), l), m), n) may be performed or addressed by at least one E2 node, e.g. an O-DU E13c, e.g. in a disaggregated architecture:

k) Support reporting a number of sleep modes and/or sleep mode feature details to SMO framework E10, l) Support reporting of at least one of 11) performance indicators (e.g., including one or more Energy Efficiency KPIs), 12) measurement reports, 13) UE context information, 14) RAN configurations, e.g. with a predetermined granularity, e.g. to the SMO framework E10, e.g. the Non-RT RIC E11, e.g. via the O1 interface, m) Support reporting of at least one of m1) performance indicators, m2) failure indicators, m3) measurement reports, m4) UE context information collection, m5) RAN configurations, e.g. with a predetermined granularity, e.g. to the Near-RT RIC E12, e.g. via the E2 interface, n) Execute at least one control/policy message received from the Near-RT RIC E12, e.g. via the E2 interface.

FIG. 18 schematically depicts a signaling or procedure flow, e.g. for the Near-RT RIC E12 (FIG. 17). Element E20 of FIG. 18 symbolizes the Service Management and Orchestration, SMO, framework, also see Element E10 of FIG. 17. Element E21 symbolizes an O-RAN, and element E22 symbolizes external applications. Element E23 symbolizes a collection and control functionality, element E24 symbolizes a Non-RT RIC (also see, for example, element E11 of FIG. 17). Element E25 symbolizes a Near-RT RIC (also see, for example, element E12 of FIG. 17), element E26 symbolizes an O-DU, and element E27 symbolizes an applications server.

In some exemplary embodiments, FIG. 18, block B1 symbolizes aspects of a data collection, block B2 symbolizes aspects of a workflow related to the ML model MLM, and block B3 symbolizes aspects of a performance evaluation and optimization.

In some exemplary embodiments, referring to block B1, arrow a10 symbolizes requesting a number of supported sleep energy saving modes, e.g. sleep modes, and/or sleep mode features, arrow a11 symbolizes collecting the requested number of supported sleep energy saving modes, e.g. sleep modes, and/or sleep mode features, arrow a12 symbolizes retrieving the collected information. Arrow a13 symbolizes requesting measurement data and RAN configurations, e.g. for at least one, e.g. for each, sleep mode and/or sleep mode feature, arrow a14 symbolizes collecting the requested measurement data and RAN configurations, e.g. for at least one, e.g. for each, sleep mode and/or sleep mode feature. Arrow a15 symbolizes collecting enrichment information, e.g. related to UE location and/or mobility, etc. Arrow a16 symbolizes retrieving the collected data.

In some exemplary embodiments, referring to block B2, arrow a20 symbolizes associating the enrichment information with measurements and/or configurations, arrow a21 symbolizes training at least one ML model MLM, e.g. to select a best (e.g., according to at least one predetermined criterion) sleep mode/sleep mode feature, and arrow a22 symbolizes deploying the at least one ML model MLM.

In some exemplary embodiments, referring to block B3, arrow a30 symbolizes requesting measurement data and RAN configurations, e.g. for at least one, e.g. for each, sleep mode and/or sleep mode feature, e.g. at least similar to arrow a13. Arrow a31 symbolizes collecting the requested measurement data and RAN configurations, e.g. for at least one, e.g. for each, sleep mode and/or sleep mode feature, e.g. at least similar to arrow a14. Arrow a32 symbolizes collecting enrichment information, e.g. related to UE location and/or mobility, etc., e.g. at least similar to arrow a15. Arrow a33 symbolizes retrieving the collected data, e.g. at least similar to arrow a16.

Arrow a34 symbolizes at least one of a performance monitoring or a performance evaluation, arrow a35 symbolizes a further training, e.g. re-training, of the at least one ML model MLM, and arrow a36 symbolizes an updating of the at least one ML model MLM.

In other words, in some exemplary embodiments, FIG. 18, arrows a10, a11, a12 relate to a configuration stage, with the O-DU's capabilities related to sleep modes exposed to the Non-RT RIC E24. The O-DU E26 may enquire at least one O-RU (see, for example, block E13d of FIG. 17) for its related O-RU capabilities, which is not illustrated in for FIG. 18 simplicity. In some exemplary embodiments, it may e.g. be basically up to an O-RU's and/or O-DU's implementation, e.g. vendor implementation, which and/or how many sleep mode/energy saving features are supported, if any.

In some exemplary embodiments, the Non-RT RIC E24 may host an rApp (not shown separately; in exemplary embodiments, the Non-RT RIC may comprise one or more rApps and a Non-RT RIC framework). In some exemplary embodiments, messages, for example a11 messages, from and to the rApp may be exchanged via an R1 interface, e.g. an API between the rApp and the Non-RT RIC framework.

In some exemplary embodiments, arrows a13 to a22 relate to a training stage. As symbolized by the arrows a13 to a16, measurements and RAN configurations for each sleep mode/energy saving feature are collected to train the model. In some exemplary embodiments, such configurations might e.g. be specific for each Sleep Mode/Energy Saving Feature, but might also change, e.g. within an operation of a Sleep Mode.

In some exemplary embodiments, the arrows a20 to a22 relate to training and deploying the AI/ML model, e.g. in the Near-RT RIC E25. In some exemplary embodiments, optionally, enrichment information (e.g., UE location information, UE application information) may be used, which may e.g. be obtained from other sources such as an application server E22. In some exemplary embodiments, e.g. eventually or continuously, a performance may be monitored, and, optionally, further optimization may be performed, e.g. including a model retraining and an update of the model in the Near-RT RIC E25.

In this regard, FIG. 19 schematically depicts a signaling or procedure flow for the Near-RT RIC E25 according to some exemplary embodiments.

In some exemplary embodiments, arrow a40 symbolizes collecting enrichment information (e.g., UE location/mobility, etc.), arrow a41 symbolizes retrieving the collected data, arrow a42 symbolizes providing the enrichment information to the Near-RT RIC E25.

In some exemplary embodiments, FIG. 19, it is assumed that the AI/ML model MLM is already deployed in the Near-RT RIC E25. The Near-RT RIC E25 may use the enrichment information for performance enhancement, which is e.g. symbolized by the arrows a40 to a42 as mentioned above.

Block B4 of FIG. 19 symbolizes aspects of am E2 control and/or Policy. Arrow a43 symbolizes requesting at least one of measurement data, configuration data, or UE context information, arrow a44 symbolizes collecting the requested data (e.g., as per arrow a43). Arrow a45 symbolizes associating the enrichment information with the collected measurements and configurations. Arrow a46 symbolizes performing an AI/ML model inference. Arrow a47 symbolizes generating a sleep mode control/policy message (see, for example, the control information CTRL-INF explained above), and arrow a48 symbolizes transmitting a respective sleep mode control/policy message, e.g. at least similar to transmitting the control information CTRL-INF, see, for example block 474 of FIG. 12.

In other words, in some exemplary embodiments, FIG. 19, the Near-RT RIC E25 may, e.g. continuously, obtain RAN measurement data (e.g., performance measurements and Energy Efficiency KPIs) and RAN configurations data as well as UE context information (e.g., UE performance, mobility info etc.) for inference. In some exemplary embodiments, the inference operation may output decisions on Sleep Mode control/guidance. In some exemplary embodiments, this output may trigger the generation of a control/policy message, see arrow a47, which is sent to the E2 Node (O-DU) E26, e.g. via the E2 interface (also see FIG. 17).

In some exemplary embodiments, the E2 Node (O-DU) E26 may either apply or select from the respective Sleep Mode (s)/Energy Saving Feature (s) or may adjust its behavior related to the type and content of the E2 message a48.

Additionally, in some exemplary embodiments, which are not shown in FIG. 19 for clarity, a configuration of at least one O-RU may be performed, e.g. follow, e.g. from the O-DU E26 over O-FH (O-RAN Fronthaul).

In some exemplary embodiments, supported Sleep Modes/Energy Saving features may either be provided by the AI/ML model MLM, or the Near-RT RIC E25 may obtain such information (e.g., characterizing supported Sleep Modes/Energy Saving features) from the E2 Node (O-DU) E26, e.g. via the E2 interface, e.g. during a configuration phase, see, for example, Block B1 of FIG. 18.

In some exemplary embodiments, it is assumed that the information characterizing supported Sleep Modes/Energy Saving features, e.g. the first information I-1 as explained above, is provided with the AI/ML model MLM, e.g. from the Non-RT RIC E24.

In some exemplary embodiments, prediction information (e.g., about expected cell load and/or user mobility or UE mobility, respectively) may be obtained, e.g. from at least one further AI/ML model (e.g., from other xApps, e.g. via a cross-xApp interface (not shown)), e.g. input, and/or the prediction information may be generated within the AI/ML model MLM, which is not depicted for the sake of clarity. Similarly, an optional API between the Near-RT RIC E25 and the xApp of block E27 according to some exemplary embodiments is not depicted by FIG. 19.

In the following, further exemplary aspects and embodiments related to an energy saving mode, e.g. sleep mode, state model for at least one DU and/or for at least one RU are discussed, which may, according to further exemplary embodiments, be combined with at least one of the exemplary embodiments discussed above.

In this regard, FIG. 20 schematically depicts a simplified state diagram according to some exemplary embodiments, wherein element S1 symbolizes an active state (e.g., for transmission and/or reception of data), wherein element S2 symbolizes a micro-sleep state, wherein element S3 symbolizes a light-sleep state, wherein element S4 symbolizes a deep-sleep state, wherein element S6 symbolizes a shutdown state, e.g. carrier/cell shutdown UC1 state. Reference sign ST1 collectively denotes state transitions from the first state S1 to a respective further state S2, S3, S4, S5, and reference sign ST2 collectively denotes state transitions from a respective one of the further states S2, S3, S4, S5 (e.g., back) to the first state S1.

FIG. 21 schematically depicts a simplified state diagram according to some exemplary embodiments, which is similar to FIG. 20, wherein state S1' of FIG. 21 corresponds with state S1 of FIG. 20, wherein state S2' of FIG. 21 corresponds with state S2 of FIG. 20, wherein state S3' of FIG. 21 corresponds with state S3 of FIG. 20, wherein state S4' of FIG. 21 corresponds with state S4 of FIG. 20, wherein state S5' of FIG. 21 corresponds with state S5 of FIG. 20. In contrast to FIG. 20, in the FIG. 21 embodiment, different state transitions collectively denoted with reference signs ST1', ST2' may be provided, wherein reference sign ST1' symbolizes subsequent state transitions from the first state S1' to a respective following state S2', and so on. Reference sign ST2' of FIG. 21 collectively denotes state transitions from a respective one of the further states S2', S3', S4', S5' (e.g., back) to the first state S1'.

In other words, in some exemplary embodiments, e.g. regarding FIG. 20, transitions are provided from and back to the active mode S1 (e.g., corresponding to a "no sleep mode", which may also be denoted as "sleep mode 0" in some exemplary embodiments).

In other words, in some exemplary embodiments, e.g. regarding FIG. 21, transitions ST1' are hierarchically increasing (and, optionally also decreasing (not shown)) the level of sleep mode.

In some exemplary embodiments, e.g. in case of a use of a central control including prediction, the embodiment of FIG. 20 may be beneficial and may e.g. provide comparatively high energy saving (e.g., as compared to the FIG. 21 configuration), e.g. since higher sleep modes may immediately be applied.

In some exemplary embodiments, e.g. in case of UE- or gNB-internal realizations, the FIG. 21 configuration may be applied, e.g. since it may not be predicted when new traffic arrives.

In some exemplary embodiments, a minimum activity time for the sleep mode or state S3 or S3' may e.g. be 100 milliseconds (ms). In some exemplary embodiments, a minimum activity time for the sleep mode or state S4 or S4' may e.g. be 1 second (s). In some exemplary embodiments, a minimum activity time for the sleep mode or state S5 or S5' may e.g. be 10 seconds or greater.

In some exemplary embodiments, FIG. 21, an energy saving mode, e.g. sleep mode, corresponding with state S2' may e.g. be denoted as "Sleep Mode 1", and/or an energy saving mode, e.g. sleep mode, corresponding with state S3' may e.g. be denoted as "Sleep Mode 2", and/or an energy saving mode, e.g. sleep mode, corresponding with state S4' may e.g. be denoted as "Sleep Mode 3", and/or an energy saving mode, e.g. sleep mode, corresponding with state S5' may e.g. be denoted as "Sleep Mode 4".

In the following, further exemplary aspects and embodiments related to Sleep Mode Information e.g. for at least one DU and/or for at least one RU are discussed, which may, according to further exemplary embodiments, be combined with at least one of the exemplary embodiments discussed above. As explained above, in some exemplary embodiments, DU/RU Sleep Mode Information may be propagated from the at least one RU to the at least one DU to the at least one RIC (e.g., "RU==>DU==>RIC"), e.g. using the first information I-1.

In some exemplary embodiments, the at least one DU to be controlled/guided may expose information, e.g. basic information, about their available sleep modes/energy saving features, e.g. in the form of the first information and/or the third information as explained above.

In some exemplary embodiments, one or more information elements associated with the information, e.g. basic information, about the available sleep modes/energy saving features of a DU and/or RU can e.g. be organized in the form of a table, see the Table 1 depicted below.

| Sleep Mode ID | Min. Activity Time | UL and/or DL | Transition Time (s) |
| --- | --- | --- | --- |
| 0 | — | UL, DL | — |
| 2 | 25 ms | UL, DL | 0→1: 3 ms \| 2→1: 2 ms |
| 3 | 1000 ms | UL, DL | 1→0: 5 ms \| 2→0: 0.75 ms |
| . | . | . | . |
| . | . | . | . |
| . | . | . | . |

In some exemplary embodiments, the Sleep Mode ID, SMID, is an integer, where, e.g., 0 indicates a default mode (e.g., active mode), that no sleep mode is activated, and the other SMIDs e.g. represent individual sleep modes or different combinations of sleep modes.

In some exemplary embodiments, the Minimum Activity Time, also see block MIN-ACT-TIM of FIG. 7, denotes the minimum amount of time for which the respective sleep mode should be activated, e.g. to provide any energy saving.

In some exemplary embodiments, the Transition Time, also see block TRANSIT-TIM of FIG. 7, refers to a duration it takes for the respective sleep mode to take effect. In case of the exemplary state model of FIG. 20, the Transition Time is the time from the active mode S1 (=no sleep mode/sleep mode 0) to the respective sleep mode.

Alternatively, in some exemplary embodiments, the Transition Time may comprise, e.g. consist of, two transmission time values, e.g. a first value characterizing a time to transition to the respective mode and a second value characterizing a time to transition back to the active mode.

In some exemplary embodiments, in case of the state model of FIG. 21, the Transition Time may be the time from the previously active mode.

In some exemplary embodiments, e.g. in case of a fully flexible state model, even more transition times or transition time values may be used, e.g. be communicated.

In some exemplary embodiments, the information element "UL and/or DL" indicates whether the respective sleep mode can be applied to downlink or uplink or both.

In some exemplary embodiments, in certain cases, some transitions may not be allowed, as e.g. shown in Table 1 above.

In some exemplary embodiments, additional information that may be relevant for optimization algorithms, e.g. intelligent optimization algorithms, e.g. associated with the at least one ML model MLM, may be beneficial for the algorithm (s). In some exemplary embodiments, examples for such additional information are e.g. a relative power consumed in the respective sleep mode, as well as the additional transition energy required to execute the state transition.

In some exemplary embodiments, Sleep Mode Information associated with at least one DU and/or RU may e.g. be of static nature and may thus e.g. preferably be communicated via a management protocol, e.g. from the RU to the DU (e.g., in form of the first information I-1), such as the O-FH M-Plane protocol specified by O-RAN.

In some exemplary embodiments, e.g. in case the Sleep Mode Information changes over time (e.g., due to a software update) there may be provided means to update the Sleep Mode Information, e.g. by means of a re-configuration procedure.

In some exemplary embodiments, a vendor, e.g. of a DU and/or an RU, may provide some criteria, e.g. characterizing when a specific sleep mode should be applied. In some exemplary embodiments, the criteria may e.g. include load information. In some exemplary embodiments, the load information may be explicit (e.g., at least one of a certain cell throughput or data volume or PRB utilization) and/or implicit and/or normalized (e.g., ranging between 0-100% load). In some exemplary embodiments, the deeper the sleep mode, the lower the load when the sleep mode is being applied.

In some exemplary embodiments, a vendor, e.g. of a DU and/or an RU, may provide performance impact characteristics, which may e.g. indicate that an available cell throughput will decrease with deeper sleep modes, while e.g. an offered latency for a call setup and/or for data transmission will increase. In some exemplary embodiments, the performance impact characteristics may be explicit and/or implicit and/or normalized (e.g. ranging between 0-100% of an offered overall capacity).

In some exemplary embodiments e.g. relating to DU/RU Sleep Mode RAN Measurements (e.g., "RU=>DU==>RIC"), a vendor may or may not be willing to unveil some or all of the characteristics as exemplarily described above.

In some exemplary embodiments, an algorithm, which may e.g. be hosted by an application associated with the RIC 16, may, e.g. if not provided by a vendor, derive some or all of the characteristics as exemplarily described above by means of measurements, e.g. during an operational state. In some exemplary embodiments, the measurements may be communicated from the RU to the DU, e.g. via a fronthaul interface ("FH"), and further from DU to the RIC, e.g. via an O1 and/or E2 interface. In some exemplary embodiments, sleep mode RAN measurements may be of dynamic nature and may thus e.g. be communicated via a control or user plane protocol, e.g. from the RU to the DU, such as the O-FH CUS-Plane protocol specified by O-RAN.

In some exemplary embodiments e.g. relating to DU/RU Sleep Mode RAN Configuration Information ("RU=>DU==>RIC"), the RAN may e.g. permanently or temporarily apply specific RAN reconfigurations, e.g. when a sleep mode is applied. Example RAN configurations that are related to energy saving features in some exemplary embodiments may e.g. relate to at least one of: configurations DRX (Discontinuous Reception)/DTX (Discontinuous Transmission), Semi-Persistent Scheduling, Uplink Grants, periodicity of transmission of physical signals and channels (e.g. Synchronization Signal Blocks, Reference Symbols, SIB1, Paging, RACH etc.), adaptation of MIMO streams, antenna configurations, transceiver chains, active antenna panels, configuration of carriers, bands, bandwidth parts or power domain adaptations.

In some exemplary embodiments, e.g. if RAN configuration information is rather static and if a vendor is willing to share sleep mode specific information (or if it will be defined as part of a standard, for example), the RAN configuration information may e.g. be communicated as part of the RU/DU Sleep Information (e.g., in form of the first information I-1), e.g. during the configuration phase. In some exemplary embodiments, for instance if the SSB block in this sleep mode will, for example always, be the maximum SSB block periodicity of e.g. 160 ms, the RIC 16 may be informed of this fact, or if it is a SSB block-less carrier etc.

In some exemplary embodiments, e.g. if the RAN configuration information is dynamic or if the vendor is not willing to share sleep mode specific information, the RAN configuration information may e.g. be communicated, e.g. repeatedly, e.g. regularly, or during at least one, for example each, reconfiguration. In some exemplary embodiments, an SSM algorithm associated with the RIC 16 may e.g. learn (e.g., once again learn) how such parameter changes relate to a specific sleep mode. In some exemplary embodiments, e.g. in the same SIB periodicity example, it could also happen that parameters are adjusted within a certain range. In some exemplary embodiments, e.g. in one sleep mode, the SIB periodicity is 20 ms or 40 ms while in the other sleep mode the SIB periodicity is 80 ms or 160 ms, e.g. depending on the cell load or the access or service requirements. In some exemplary embodiments, if such RAN configuration parameters t communicated during the configuration phase, the RIC 16 may ask for reporting of such energy saving/energy efficiency related relevant parameters. In some exemplary embodiments, configuration information can be obtained from an O-CU which e.g. hosts an RRC protocol that communicates configuration information to the UE and the base stations' lower layer.

In some exemplary embodiments, some of the RAN configuration parameters such as the SIB example are cell specific, while others are UE specific. In some exemplary embodiments, an example of a UE specific RAN configuration parameter is the DRX/DTX configuration. In some exemplary embodiments, the RIC 16 may request a reporting of the DRX/DTX configuration.

In some exemplary embodiments, e.g. if a DRX/DTX configuration of some, for example all, UEs of a cell is aligned to each other in a sleep mode, it may be likely that the DU and/or the RU may be switched off (e.g., at least transition to some energy saving state) during the transmission gaps resulting from the alignment of the DRX/DTX configuration. In some exemplary embodiments, such configuration may impact cell and/or user performance, e.g. due to a reduced transmission time. In some exemplary embodiments, considering such information, the RIC 16 may be able to learn a behavior and/or effects of different sleep modes on an operation of at least some components of the communication system 10 and may e.g. optimize a use of different sleep modes, e.g. for different operational states of a cell or a the communication system 10, e.g. network.

In some exemplary embodiments, related to RIC Sleep Mode Control/Guidance (e.g., "RIC==>DU=>RU"), E2-interface based Policy providing the control/guidance to the DU includes at least one sleep mode, identified by its SMID (e.g., as comprised in the first information I-1).

In some exemplary embodiments, a range of sleep modes or some limits may alternatively be communicated, e.g. from the RIC to the DU and/or from the DU to the RU, e.g. to provide some freedom to the base station BS (FIG. 2), e.g. for a fast adaptation, e.g. within the given range/limits. In some exemplary embodiments, particularly the "short", e.g. less deep, sleep modes may rely on information, e.g. instantaneous information, which may e.g. only be available at the base station BS. In some exemplary embodiments, control loop associated with the RIC 16, e.g. via the E2 interface, may e.g. be too slow for at least some comparatively fast adjustments according to some embodiments.

In some exemplary embodiments, the configuration information CTRL-INF, e.g. policy, may, e.g. additionally, include at least one of: a) duration for which a sleep mode is to be activated, b) an indication of activation on the UL and/or DL, c) a fallback option, e.g. in case of a fail and/or the expiry of the activity duration, d) a RAN configuration to be applied during the sleep mode.

In some exemplary embodiments, the DU may e.g. provide feedback, e.g. to the SMM application SMM-APP (FIG. 16), e.g. as to whether it has successfully applied the recommended sleep mode in the policy, e.g. configuration information CTRL-INF.

In some exemplary embodiments, e.g. if specific sleep mode features are specified, the specific sleep mode features may e.g. be controlled by the RIC 16, or the RIC 16 may ask for RAN specific configurations to be applied. Similarly, in some exemplary embodiments, the RIC 16 may ask the base station BS to apply certain minimum performance characteristics, e.g. in terms of at least one of cell throughput, data volume, maximum user plane latency or UE access performance.

Further exemplary embodiments, FIG. 22, relate to a computer program product DC comprising instructions PRG which, when the program is executed by a computer 102, 202, 302, cause the computer 102, 202, 302 to carry out the method according to the embodiments.

Further exemplary embodiments relate to a data carrier signal DCS carrying and/or characterizing the computer program (product) PRG, DC according to the embodiments.

Further exemplary embodiments relate to a use of at least one of a) the apparatus 100, 100', 200, 200', 300, 300' according to the embodiments, b) the method according to the embodiments, c) the distributed unit according to the embodiments, d) the radio unit according to the embodiments, e) the RAN controller, for example RIC, according to the embodiments, f) the communication system 10, e.g. communication network, according to the embodiments, g) the computer program product DC according to the embodiments, h) the data carrier signal DCS according to the embodiments, for at least one of the following elements: A) enabling a common control of energy saving modes of several components 12, 14 of a communication system 10, B) providing an efficient guidance or configuration of energy saving modes of several components 12, 14 of a communication system 10, C) reducing an overall electrical energy consumption of a communication system 10, D) unifying a control associated with energy saving modes of different components 12, 14 of a communication system 10, E) enabling a capability exchange of supported energy saving modes and/or sleep modes and/or energy saving functions of different components 12, 14 of a communication system 10, F) allocating identifiers for energy saving modes, e.g. sleep modes, G) dynamically, e.g. during an operation, optimizing an overall energy consumption of a communication network 10.

In some exemplary embodiments, aspects of the principle according to the embodiments may e.g. be described in the following exemplary form, which may e.g. be used to specify an energy saving mode, e.g. sleep mode, control service, e.g. for a protocol according to some accepted standard, such as e.g. an E2SM-RC protocol as specified by O-RAN.

In some exemplary embodiments, a Control Message may for instance be specified in E2SM-RC (E2 Service Model RAN Control Procedure) as described below. In the present example, a Sleep Mode is configured via control or policy. In some exemplary embodiments, additional parameters, e.g. additional to the Sleep Mode, can be added to control messages, e.g. on a per sleep mode basis.

In the following, exemplary and non-limiting descriptions of aspects and exemplary embodiments of a protocol description based on the principle according to the embodiments are provided between the sections "***Begin Control Service*" and "*End Control Service*", and between the sections "*Begin Policy Service*" and "*End Policy Service***".

***Begin Control Service***
7.6.xx CONTROL Service Style 11: Sleep Mode Configuration Control
7.6.xx.1 CONTROL Service Style Description This CONTROL Service style provides a mechanism to add, modify or delete sleep mode configuration for a E2 Node using the RIC Control Message IE and the RIC Control Header IE.

Applications of this service include:
Configure, reconfigure, or release sleep mode [xx] for a E2 Node.

The supported RAN control actions and the corresponding RAN parameters are as follows:

| Control Action ID | Control Action Name | Control Action description | Associated RAN Parameters |
|---|---|---|---|
| 1 | Sleep Mode Configuration | To configure, reconfigure, or release sleep mode for a E2 Node. The (re) configured sleep mode index and sleep mode feature index is the best inferred sleep mode by AI/ML to be used for the E2 Node [xx]. | 8.4.xx.1 |

7.6.xx.2 CONTROL Service RIC Control Header IE contents

The CONTROL Service RIC Control Header IE has the UE ID IE, the Control Service Style ID IE, the Control Action ID IE. The RIC Control Decision IE for this service style is currently not supported for this control service style.

This CONTROL style uses RIC Control Header IE Format 1 (9.2.1.6.1).
7.6.xx.3 CONTROL Service RIC Control Message IE contents This CONTROL Service RIC Control Message IE contains the sequence of RAN parameters, associated with a given Control Action within this Control Service style.

The corresponding RAN parameters supported for RIC Control Message IE are given in Section 8.4.xx.

This CONTROL style uses RIC Control Message IE Format 1 (9.2.1.7.1).
8.4.xx Sleep Mode Configuration Control
8.4.xx.1 Sleep Mode Configuration

| RAN Parameter ID | RAN Parameter | RAN Parameter Value Type | Key Flag | RAN Parameter Definition | Semantics Description |
|---|---|---|---|---|---|
| 1 | Sleep Mode Index | ELEMENT | TRUE | INTEGER (1 . . . 4, . . .) | Value = 1 means Active Mode. Value 2 means Sleep Mode 1. Value 3 means Sleep Mode 2. Value 3 means Sleep Mode 3. |

Upon receiving the RIC Control Request message, the E2 node shall invoke procedures related to configuring the sleep mode index for the E2 Node given by the value of the Sleep Mode Index IE. The recommended value of the sleep mode index given by the Sleep Mode Index IE if configured, is saved by the E2 node. The E2 Node shall use the Sleep Mode Index IE recommended by the Near-RT RIC (that is saved in the E2 node).
***End Control Service***
***Begin Policy Service***
7.7.10 POLICY Service Style YY: Sleep Mode Configuration Control
7.7.10.1 POLICY Service Style Description This POLICY Service style provides an imperative policy to add, modify or delete sleep mode configuration for a E2 Node.

Applications of this service include:
Policy to configure, reconfigure, or release sleep mode for a E2 Node
7.7.10.2 POLICY Service RIC Action Definition IE contents This POLICY Service style uses RIC Action Definition IE Format 2 (9.2.1.2.2) using the approach described in Section 7.7.1.

The supported Policy Actions for this Policy style are as follows:

| Policy Action ID | Policy Action Name | Policy Action Description | Associated RAN parameters |
|---|---|---|---|
| 1 | Policy for Sleep Mode Configuration | To setup a policy to configure, reconfigure, or release sleep mode feature [xx] for a E2 Node. This policy action of (re) configuring or releasing sleep mode index is applied only when the corresponding policy condition (if configured) is triggered. The (re) configured sleep mode index is the best sleep mode configuration inferred by AI/ML to be used by the E2 Node [xx]. | 8.5.yy.1 |

***End Policy Service***

In some exemplary embodiments, e.g. additionally to or instead of sleep mode numbers or identifiers, such as e.g. 1, 2, 3, . . . N, specific names might be assigned such as micro sleep, light sleep, deep sleep, hibernate etc.

The invention claimed is:

1. An apparatus for a distributed unit of a communication system, the apparatus comprising:
at least one processor; and
at least one memory storing instructions, the at least one memory and the instructions configured to, with the at least one processor, cause the distributed unit to receive from at least one radio unit first information (I-1) characterizing a capability of the at least one radio unit associated with at least one energy saving function, wherein the first information comprises information (I-ENERGY-SAVING-FEAT) characterizing at least one energy saving feature supported by the at least one radio unit.

2. The apparatus according to claim 1, wherein the instructions, when executed by the at least one processor, cause the distributed unit to transmit the first information (I-1) to at least one further entity.

3. The apparatus according to claim 1, wherein the instructions, when executed by the at least one processor, cause the distributed unit to perform at least one of: a) receiving a request (I-1-REQ') to perform at least one of: a1) requesting the first information (I-1) from the at least one radio unit, a2) transmitting third information (1-3) characterizing a capability of the distributed unit associated with at least one energy saving function to at least one further entity, a3) determining fourth information, which is based on at least one of the first (I-1) information and the third information (I-3), a4) transmitting the fourth information (I-4) to the at least one further entity, b) requesting the first information (I-1) from the at least one radio unit.

4. The apparatus according to claim 1, wherein the first information (I-1) further comprises information (I-SLEEP-MODES) characterizing at least one energy saving mode, for example sleep mode, supported by the at least one radio unit.

5. The apparatus according to claim 1, wherein the instructions, when executed by the at least one processor, cause the distributed unit to perform at least one of: a) negotiating a configuration which energy saving modes to utilize, b) negotiating which energy saving mode not to utilize, c) assigning an identifier (ID-ESM_1) to at least one energy saving mode (ESM_1), d) storing second information (I-2) characterizing at least one energy saving mode to be utilized, e) transmitting third information (I-3) characterizing a capability of the distributed unit associated with at least one energy saving function to at least one further entity, f) storing at least one of the first information (I-1) or the third information (1-3) or the fourth information (I-4).

6. The apparatus according to claim 1, wherein the instructions, when executed by the at least one processor, cause the distributed unit to perform at least one of: a) receiving control information (CTRL-INF) characterizing at least one of a1) one or more energy saving functions or a2) energy saving modes to be utilized by at least one of A) the at least one distributed unit or B) at least one radio unit associated with the at least one distributed unit, b) utilizing at least one of b1) the one or more energy saving functions or b2) the energy saving modes, c) controlling at least one radio unit associated with the distributed unit to utilize at least one of c1) one or more energy saving functions based on the control information (CTRL-INF) or c2) energy saving modes based on the control information (CTRL-INF).

7. The apparatus according to claim 1, wherein at least one of the first information (I-1) and the third information (I-3) and the fourth information (I-4) comprises at least one of: a) an identifier (ID-ESM) associated with at least one energy saving mode (ESM), b) a minimum activity time (MIN-ACT-TIM) associated with the at least one energy saving mode (ESM), c) an indicator (IND-UL-DL) indicating whether the at least one energy saving mode (ESM) can be used for at least one of c1) a downlink operation or c2) an uplink operation, d) at least one transition time (TRANSIT-TIM) characterizing at least one state transition or mode transition associated with the at least one energy saving mode (ESM), e.g. a state transition between two energy saving modes, e) at least one transition energy (TRANSIT-ENRG) characterizing an energy associated with at least one state transition or mode transition associated with the at least one energy saving mode (ESM), e.g. a state transition between two energy saving modes, f) a power (POW-ESM) consumption associated with the at least one energy saving mode (ESM), g) aspects (ASP-RAN-CFG) of a radio access network configuration.

8. An apparatus for a radio unit of a communication system, the apparatus comprising:
at least one processor; and
at least one memory storing instructions, the at least one memory and the instructions configured to, with the at least one processor, cause the radio unit to transmit first information (I-1) characterizing a capability of the radio unit associated with at least one energy saving function to a distributed unit of the communication system, wherein the first information comprises information (I-ENERGY-SAVING-FEAT) characterizing at least one energy saving feature supported by the at least one radio unit.

9. The apparatus of claim 8, wherein the instructions, when executed by the at least one processor, cause the radio unit to receive a request (I-1-REQ) to provide the first information (I-1).

10. The apparatus of claim 8, wherein the instructions, when executed by the at least one processor, cause the radio unit to receive control information (CTRL-INF') instructing the radio unit to utilize at least one of a) one or more energy saving functions or b) one or more energy saving modes, and to utilize at least one of c) the one or more energy saving functions or d) the one or more energy saving modes, based on the control information (CTRL-INF').

11. An apparatus for a communication system, the apparatus comprising:

at least one processor; and at least one memory storing instructions, the at least one memory and the instructions configured to, with the at least one processor, cause the apparatus to receive from at least one distributed unit first information (I-1) characterizing a capability associated with at least one energy saving function of at least one radio unit associated with the at least one distributed unit; and transmit a request (I-1-REQ') to the at least one distributed unit to perform at least one of: a1) requesting the first information (I-1) from the at least one radio unit associated with the at least one distributed unit, a2) determining fourth information (I-4), which is based on at least one of the first information (I-1) and the third information (I-3), and a3 transmitting the fourth information (I-4) to the at least one further entity.

12. The apparatus according to claim 11, wherein the instructions, when executed by the at least one processor, further cause the apparatus to transmit a request (I-1-REQ') to the at least one distributed unit to perform transmitting third information (I-3) characterizing a capability of the distributed unit associated with at least one energy saving function to at least one further entity.

13. The apparatus according to claim 11, wherein the instructions, when executed by the at least one processor, cause the apparatus to transmit to the at least one distributed unit control information (CTRL-INF) characterizing at least one of a) one or more energy saving functions or b) one or more energy saving modes, to be utilized by at least one of A) the at least one distributed unit or B) the at least one radio unit associated with the at least one distributed unit.

14. The apparatus according to claim 11, wherein the instructions, when executed by the at least one processor, cause the apparatus to provide a machine learning model (MLM) that is at least one of a) trainable or b) configured to predict at least one of A) at least one preferred energy saving mode (ESM-PREF) or B) at least one preferred energy saving feature (ESF-PREF) based on conditions (COND-SYS) associated with the communication system.

15. The apparatus according to claim 14, wherein the machine learning model (MLM) comprises at least one of: a) a neural network (NN), b) a deep neural network (DNN), c) a classifier (CLASS), d) a clustering method (CLUST), e) a pattern detection technique (PATT), f) a data mining method (MINE), g) an estimation and detection method (EST-DET).

16. The apparatus according to claim 14, wherein the conditions (COND-SYS) associated with the communication system comprise at least one of: a) network configuration related data (DAT-CFG) associated with the communication system, b) network performance related data (DAT-PERF) associated with the communication system.

17. The apparatus according to claim 14, wherein the instructions, when executed by the at least one processor, cause the apparatus to train the machine learning model (MLM) based on the conditions (COND-SYS) associated with the communication system.

18. The apparatus according to claim 14, wherein the instructions, when executed by the at least one processor, cause the apparatus to use the machine learning model (MLM) based on the conditions (COND-SYS) associated with the communication system.

* * * * *